United States Patent
Xing

(10) Patent No.: US 10,314,086 B2
(45) Date of Patent: Jun. 4, 2019

(54) RADIO BEARER SETUP METHOD AND DEVICE

(71) Applicant: HUAWEI TECHNOLOGIES CO., LTD., Shenzhen, Guangdong (CN)

(72) Inventor: Pingping Xing, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 15/818,388

(22) Filed: Nov. 20, 2017

(65) Prior Publication Data

US 2018/0132294 A1 May 10, 2018

Related U.S. Application Data

(63) Continuation of application No. PCT/CN2015/079595, filed on May 22, 2015.

(51) Int. Cl.
*H04W 76/10* (2018.01)
*H04W 72/04* (2009.01)

(52) U.S. Cl.
CPC ........... *H04W 76/10* (2018.02); *H04W 72/04* (2013.01)

(58) Field of Classification Search
CPC .............................. H04W 76/10; H04W 72/04
See application file for complete search history.

(56) References Cited

U.S. PATENT DOCUMENTS

| 2009/0016245 | A1 | 1/2009 | Karls |
| 2013/0137469 | A1* | 5/2013 | Schmidt .............. H04W 74/006 455/466 |
| 2013/0201924 | A1 | 8/2013 | Song et al. |
| 2013/0329715 | A1* | 12/2013 | Li ......................... H04W 16/02 370/338 |
| 2014/0092866 | A1 | 4/2014 | Teyeb et al. |

(Continued)

FOREIGN PATENT DOCUMENTS

| CN | 1964228 A | 5/2007 |
| CN | 104244450 A | 12/2014 |

(Continued)

OTHER PUBLICATIONS

International Search Report in International Application No. PCT/CN2015/079595, dated Feb. 15, 2016, 6 pages.

(Continued)

*Primary Examiner* — Chi Ho A Lee
(74) *Attorney, Agent, or Firm* — Fish & Richardson P.C.

(57) ABSTRACT

Embodiments of the present invention provide a radio bearer setup method, including: establishing, by a base station, an SRB with UE according to a configuration parameter of the SRB, and establishing, according to configuration parameters of N DRBs that carry N services, the N DRBs with the UE, where N≥2, N is an integer, M of the N DRBs occupy different transmission channels and different physical channels, 2≤M≤N, M is an integer, and a transmission channel and a physical channel occupied by the SRB are different from a transmission channel and a physical channel occupied by at least one of the N DRBs. In this way, interruption in all service data between the UE and the base station and a call drop in a communication connection are avoided.

15 Claims, 12 Drawing Sheets

A base station establishes an SRB with UE according to a configuration parameter of the SRB, where the configuration parameter of the SRB is used to indicate a transmission channel and a physical channel occupied by the SRB — S101

The base station establishes, according to configuration parameters of N DRBs that carry N services, the N DRBs with the UE, where N is an integer greater than or equal to 2, and the configuration parameters of the N DRBs are used to indicate transmission channels and physical channels occupied by the N DRBs — S102

(56) References Cited

U.S. PATENT DOCUMENTS

| | | | |
|---|---|---|---|
| 2014/0106768 A1* | 4/2014 | Song | H04W 4/14 455/452.1 |
| 2014/0241149 A1* | 8/2014 | Liu | H04W 8/22 370/228 |
| 2014/0243040 A1* | 8/2014 | Bienas | H04W 76/23 455/552.1 |
| 2015/0003435 A1 | 1/2015 | Horn et al. | |
| 2015/0065136 A1* | 3/2015 | Lee | H04W 24/02 455/436 |
| 2015/0173118 A1* | 6/2015 | Gholmieh | H04W 76/10 455/436 |
| 2016/0119831 A1* | 4/2016 | Deng | H04W 36/0072 455/436 |
| 2016/0192249 A1* | 6/2016 | Wu | H04W 76/18 370/331 |
| 2016/0255545 A1* | 9/2016 | Gholmieh | H04W 36/0077 370/331 |
| 2017/0013565 A1* | 1/2017 | Pelletier | H04W 52/146 |
| 2018/0139745 A1* | 5/2018 | Xiao | H04W 76/15 |
| 2018/0146504 A1* | 5/2018 | Xiao | H04W 76/16 |

FOREIGN PATENT DOCUMENTS

| | | | |
|---|---|---|---|
| EP | 2943008 A1 | 11/2015 | |
| WO | 2014106483 A1 | 7/2014 | |
| WO | 2015008989 A1 | 1/2015 | |

OTHER PUBLICATIONS

Extended European Search Report issued in European Application No. 15892836.6 dated Mar. 26, 2018, 8 pages.

\* cited by examiner

RADIO BEARER SETUP METHOD AND DEVICE

CROSS-REFERENCE TO RELATED APPLICATIONS

This application is a continuation of International Application No. PCT/CN2015/079595, filed on May 22, 2015, the disclosure of which is hereby incorporated by reference in its entirety.

TECHNICAL FIELD

Embodiments of the present invention relate to the field of communications technologies, and in particular, to a radio bearer setup method and a device.

BACKGROUND

In a wireless communications network, an interface between user equipment (User equipment, UE for short) and a base station belongs to an air interface, AI for short. A protocol stack of the air interface is divided into a control plane (Control Plane, CP for short) and a user plane (User Plane, UP for short). A signaling radio bearer (Signaling Radio Bearer, SRB for short) is established between the UE and the base station to complete connection establishment on the control plane, and a data radio bearer (Data Radio Bearer, DRB for short) is established based on the connection establishment on the control plane, so as to complete connection establishment on the user plane. One SRB may correspond to multiple DRBs, and one DRB corresponds to one type of service data (for example, a video or web page browsing except a broadcast service). Signaling information and data information may be separately transferred at a radio link control layer, a media access control layer, and a physical layer by an SRB and a DRB by using a logical channel, a transmission channel, and a physical channel.

However, in the prior art, in a cell that UE accesses, an SRB and all DRBs respectively corresponding to all services are multiplexed to a same transmission channel and a same physical channel for transmission. If a configuration of the SRB or one or some of the DRBs changes, because QoS requirements of all the DRBs are different, the transmission channel and the physical channel need to be re-configured, thereby causing interruption in all service data between the UE and a base station, and degrading user experience.

SUMMARY

Embodiments of the present invention provide a radio bearer setup method and a device, so as to avoid a problem of interruption in all service data between UE and a base station caused when a configuration of one or some of DRBs changes in a cell that the UE accesses.

According to a first aspect, an embodiment of the present invention provides a base station, including:

an SRB setup unit, configured to establish an SRB with user equipment UE according to a configuration parameter of the SRB, where the configuration parameter of the SRB is used to indicate a transmission channel and a physical channel occupied by the SRB; and a DRB setup unit, configured to establish, according to configuration parameters of N DRBs that carry N services, the N DRBs with the UE, where N is an integer greater than or equal to 2, and the configuration parameters of the N DRBs are used to indicate transmission channels and physical channels occupied by the N DRBs; and M of the N DRBs occupy different transmission channels and different physical channels, M is an integer greater than or equal to 2 and less than or equal to N, and the transmission channel and the physical channel occupied by the SRB are different from a transmission channel and a physical channel occupied by at least one of the N DRBs.

In a first possible implementation of the first aspect, the base station further includes:

a sending unit, configured to: before the SRB setup unit establishes the SRB with the UE according to the configuration parameter of the SRB, send the configuration parameter of the SRB and the configuration parameters of the N DRBs to the UE.

In a second possible implementation of the first aspect, the base station further includes:

a sending unit, configured to: before the DRB setup unit establishes the N DRBs with the UE according to the configuration parameters of the N DRBs, send the configuration parameters of the N DRBs to the UE by using the SRB.

With reference to the first aspect, the first possible implementation of the first aspect, or the second possible implementation of the first aspect, in a third possible implementation of the first aspect, M cells that respectively establish the M DRBs with the UE are different.

With reference to the third possible implementation of the first aspect, in a fourth possible implementation of the first aspect, radio access technologies (Radio Access Technology, RAT for short) of the M cells that respectively establish the M DRBs with the UE are different.

With reference to any one of the first aspect, or the first to the fourth possible implementations of the first aspect, in a fifth possible implementation of the first aspect, the sending unit is further configured to: after the DRB setup unit establishes the N DRBs with the UE according to the configuration parameters of the N DRBs, when the UE needs to transmit service data in a target cell, send a first setup command to the UE by using the SRB, where the target cell is a cell to which K of the N DRBs are to be handed over; and 1≤K<N, K is an integer, the first setup command includes a configuration parameter of a DRB established between the UE and the target cell, the configuration parameter of the DRB established between the UE and the target cell is used to indicate a transmission channel and a physical channel occupied by the DRB established between the UE and the target cell, and transmission channels and physical channels occupied by the K DRBs established between the UE and the target cell are different from a transmission channel and a physical channel occupied by at least one of the N DRBs except the K DRBs.

With reference to any one of the first aspect, or the first to the fourth possible implementations of the first aspect, in a sixth possible implementation of the first aspect, the sending unit is further configured to: after the SRB setup unit establishes the SRB with the UE according to the configuration parameter of the SRB, when the UE needs to transmit control data in a target cell, send a second setup command to the UE by using the SRB, where the second setup command includes a configuration parameter of an SRB established between the UE and the target cell, and the target cell is a cell to which the SRB is to be handed over; and the configuration parameter of the SRB established between the UE and the target cell is used to indicate a transmission channel and a physical channel occupied by the SRB established between the UE and the target cell, and the transmission channel and the physical channel occupied by the SRB established between the UE and the target cell are different from the transmission channel and the physical channel occupied by the at least one of the N DRBs.

According to a second aspect, an embodiment of the present invention provides UE, including:

an SRB setup unit, configured to establish an SRB with a base station according to a configuration parameter of the SRB, where the configuration parameter of the SRB is used to indicate a transmission channel and a physical channel occupied by the SRB; and a DRB setup unit, configured to establish, according to configuration parameters of N DRBs that carry N services, the N DRBs with the base station, where N is an integer greater than or equal to 2, and the configuration parameters of the N DRBs are used to indicate transmission channels and physical channels occupied by the N DRBs; and M of the N DRBs occupy different transmission channels and different physical channels, M is an integer greater than or equal to 2 and less than or equal to N, and the transmission channel and the physical channel occupied by the SRB are different from a transmission channel and a physical channel occupied by at least one of the N DRBs.

In a first possible implementation of the second aspect, the method further includes:

a receiving unit, configured to: before the SRB setup unit establishes the SRB with the base station according to the configuration parameter of the SRB, receive the configuration parameter of the SRB and the configuration parameters of the N DRBs that are sent by the base station.

In a second possible implementation of the second aspect, the UE further includes:

a receiving unit, configured to: before the DRB setup unit establishes the N DRBs with the base station according to the configuration parameters of the N DRBs, receive, by using the SRB, the configuration parameters that are of the N DRBs and that are sent by the base station.

With reference to the second aspect, the first possible implementation of the second aspect, or the second possible implementation of the second aspect, in a third possible implementation of the second aspect, M cells that respectively establish the M DRBs with the UE are different.

With reference to the third possible implementation of the second aspect, in a fourth possible implementation of the second aspect, RATs of the M cells that respectively establish the M DRBs with the UE are different.

With reference to any one of the second aspect, or the first to the fourth possible implementations of the second aspect, in a fifth possible implementation of the second aspect, the receiving unit is further configured to: after the DRB setup unit establishes the N DRBs with the base station according to the configuration parameters of the N DRBs, receive, by using the SRB, a first setup command sent by the base station, where the first setup command includes a configuration parameter of a DRB established between the UE and a target cell, the target cell is a cell to which K of the N DRBs are to be handed over, 1≤K<N, K is an integer, and the configuration parameter of the DRB established between the UE and the target cell is used to indicate transmission channels and physical channels occupied by the K DRBs established between the UE and the target cell; and the DRB setup unit is further configured to establish the K DRBs with the target cell according to the first setup command, where the transmission channels and the physical channels occupied by the K DRBs established between the UE and the target cell are different from a transmission channel and a physical channel occupied by at least one of the N DRBs except the K DRBs.

With reference to any one of the second aspect, or the first to the fourth possible implementations of the second aspect, in a sixth possible implementation of the second aspect, the receiving unit is further configured to: after the SRB setup unit establishes the SRB with the base station according to the configuration parameter of the SRB, receive, by using the SRB, a second setup command sent by the base station, where the second setup command includes a configuration parameter of an SRB established between the UE and a target cell, the target cell is a cell to which the SRB is to be handed over, and the configuration parameter of the SRB established between the UE and the target cell is used to indicate a transmission channel and a physical channel occupied by the SRB established between the UE and the target cell; and the SRB setup unit is further configured to establish the SRB with the target cell according to the second setup command, where the transmission channel and the physical channel occupied by the SRB established between the UE and the target cell are different from the transmission channel and the physical channel occupied by the at least one of the N DRBs.

According to a third aspect, an embodiment of the present invention further provides a base station, including:

a transceiver, configured to communicate with an external of the base station; and a processor, configured to: establish an SRB with UE according to a configuration parameter of the SRB, where the configuration parameter of the SRB is used to indicate a transmission channel and a physical channel occupied by the SRB; and establish, according to configuration parameters of N DRBs that carry N services, the N DRBs with the UE, where N is an integer greater than or equal to 2, and the configuration parameters of the N DRBs are used to indicate transmission channels and physical channels occupied by the N DRBs; and M of the N DRBs occupy different transmission channels and different physical channels, M is an integer greater than or equal to 2 and less than or equal to N, and the transmission channel and the physical channel occupied by the SRB are different from a transmission channel and a physical channel occupied by at least one of the N DRBs.

In a first possible implementation of the third aspect, the processor is further configured to: before establishing the SRB with the UE according to the configuration parameter of the SRB, send the configuration parameter of the SRB and the configuration parameters of the N DRBs to the UE by using the transceiver.

In a second possible implementation of the third aspect, the processor is further configured to: before establishing the N DRBs with the UE according to the configuration parameters of the N DRBs, send the configuration parameters of the N DRBs to the UE by using the transceiver and by using the SRB.

With reference to the third aspect, the first possible implementation of the third aspect, or the second possible implementation of the third aspect, in a third possible implementation of the third aspect, M cells that respectively establish the M DRBs with the UE are different.

With reference to the third possible implementation of the third aspect, in a fourth possible implementation of the third aspect, RATs of the M cells that respectively establish the M DRBs with the UE are different.

With reference to any one of the third aspect, or the first to the fourth possible implementations of the third aspect, in a fifth possible implementation of the third aspect, the processor is further configured to: after establishing the N DRBs with the UE according to the configuration parameters of the N DRBs, when the UE needs to transmit service data in a target cell, send a first setup command to the UE by using the transceiver and by using the SRB, where the target cell is a cell to which K of the N DRBs are to be handed over; and $1 \leq K < N$, K is an integer, the first setup command includes a configuration parameter of a DRB established between the UE and the target cell, the configuration parameter of the DRB established between the UE and the target cell is used to indicate a transmission channel and a physical channel occupied by the DRB established between the UE and the target cell, and transmission channels and physical channels occupied by the K DRBs established between the UE and the target cell are different from a transmission channel and a physical channel occupied by at least one of the N DRBs except the K DRBs.

With reference to any one of the third aspect, or the first to the fourth possible implementations of the third aspect, in a sixth possible implementation of the third aspect, the processor is further configured to: after establishing the SRB with the UE according to the configuration parameter of the SRB, when the UE needs to transmit control data in a target cell, send a second setup command to the UE by using the transceiver and by using the SRB, where the second setup command includes a configuration parameter of an SRB established between the UE and the target cell, and the target cell is a cell to which the SRB is to be handed over; and the configuration parameter of the SRB established between the UE and the target cell is used to indicate a transmission channel and a physical channel occupied by the SRB established between the UE and the target cell, and the transmission channel and the physical channel occupied by the SRB established between the UE and the target cell are different from the transmission channel and the physical channel occupied by the at least one of the N DRBs.

According to a fourth aspect, an embodiment of the present invention further provides UE, including:

a transceiver, configured to communicate with an external of the UE; and a processor, configured to: establish an SRB with a base station according to a configuration parameter of the SRB, where the configuration parameter of the SRB is used to indicate a transmission channel and a physical channel occupied by the SRB; and establish, according to configuration parameters of N DRBs that carry N services, the N DRBs with the base station, where N is an integer greater than or equal to 2, and the configuration parameters of the N DRBs are used to indicate transmission channels and physical channels occupied by the N DRBs; and M of the N DRBs occupy different transmission channels and different physical channels, M is an integer greater than or equal to 2 and less than or equal to N, and the transmission channel and the physical channel occupied by the SRB are different from a transmission channel and a physical channel occupied by at least one of the N DRBs.

In a first possible implementation of the fourth aspect, the processor is further configured to: before establishing the SRB with the base station according to the configuration parameter of the SRB, receive, by using the transceiver, the configuration parameter of the SRB and the configuration parameters of the N DRBs that are sent by the base station.

In a second possible implementation of the fourth aspect, the processor is further configured to: before establishing the N DRBs with the base station according to the configuration parameters of the N DRBs, receive, by using the transceiver and by using the SRB, the configuration parameters that are of the N DRBs and that are sent by the base station.

With reference to the fourth aspect, the first possible implementation of the fourth aspect, or the second possible implementation of the fourth aspect, in a third possible implementation of the fourth aspect, M cells that respectively establish the M DRBs with the UE are different.

With reference to the third possible implementation of the fourth aspect, in a fourth possible implementation of the fourth aspect, RATs of the M cells that respectively establish the M DRBs with the UE are different.

With reference to any one of the fourth aspect, or the first to the fourth possible implementations of the fourth aspect, in a fifth possible implementation of the fourth aspect, the processor is further configured to: after establishing the N DRBs with the base station according to the configuration parameters of the N DRBs, receive, by using the transceiver and by using the SRB, a first setup command sent by the base station, where the first setup command includes a configuration parameter of a DRB established between the UE and a target cell, the target cell is a cell to which K of the N DRBs are to be handed over, $1 \leq K < N$, K is an integer, and the configuration parameter of the DRB established between the UE and the target cell is used to indicate transmission channels and physical channels occupied by the K DRBs established between the UE and the target cell; and establish the K DRBs with the target cell according to the first setup command, where the transmission channels and the physical channels occupied by the K DRBs established between the UE and the target cell are different from a transmission channel and a physical channel occupied by at least one of the N DRBs except the K DRBs.

With reference to any one of the fourth aspect, or the first to the fourth possible implementations of the fourth aspect, in a sixth possible implementation of the fourth aspect, the processor is further configured to: after establishing the SRB with the base station according to the configuration parameter of the SRB, receive, by using the transceiver and by using the SRB, a second setup command sent by the base station, where the second setup command includes a configuration parameter of an SRB established between the UE and a target cell, the target cell is a cell to which the SRB is to be handed over, and the configuration parameter of the SRB established between the UE and the target cell is used to indicate a transmission channel and a physical channel occupied by the SRB established between the UE and the target cell; and establish the SRB with the target cell according to the second setup command, where the transmission channel and the physical channel occupied by the SRB established between the UE and the target cell are different from the transmission channel and the physical channel occupied by the at least one of the N DRBs.

According to a fifth aspect, an embodiment of the present invention provides a radio bearer setup method, including:

establishing, by a base station, an SRB with UE according to a configuration parameter of the SRB, where the configuration parameter of the SRB is used to indicate a transmission channel and a physical channel occupied by the SRB; and establishing, by the base station according to configuration parameters of N DRBs that carry N services, the N DRBs with the UE, where N is an integer greater than or equal to 2, and the configuration parameters of the N DRBs are used to indicate transmission channels and physical channels occupied by the N DRBs; and M of the N DRBs occupy different transmission channels and different physical channels, M is an integer greater than or equal to 2 and less than or equal to N, and the transmission channel and the physical channel occupied by the SRB are different from a transmission channel and a physical channel occupied by at least one of the N DRBs.

In a first possible implementation of the fifth aspect, before the base station establishes the SRB with the UE according to the configuration parameter of the SRB, the method further includes:

sending, by the base station, the configuration parameter of the SRB and the configuration parameters of the N DRBs to the UE.

In a second possible implementation of the fifth aspect, before the base station establishes the N DRBs with the UE according to the configuration parameters of the N DRBs, the method further includes:

sending, by the base station, the configuration parameters of the N DRBs to the UE by using the SRB.

With reference to the fifth aspect, the first possible implementation of the fifth aspect, or the second possible implementation of the fifth aspect, in a third possible implementation of the fifth aspect, M cells that respectively establish the M DRBs with the UE are different.

With reference to the third possible implementation of the fifth aspect, in a fourth possible implementation of the fifth aspect, RATs of the M cells that respectively establish the M DRBs with the UE are different.

With reference to any one of the fifth aspect, or the first to the fourth possible implementations of the fifth aspect, in a fifth possible implementation of the fifth aspect, after the base station establishes the N DRBs with the UE according to the configuration parameters of the N DRBs, the method further includes:

when the UE needs to transmit service data in a target cell, sending, by the base station, a first setup command to the UE by using the SRB, where the target cell is a cell to which K of the N DRBs are to be handed over; and $1 \leq K < N$, K is an integer, the first setup command includes a configuration parameter of a DRB established between the UE and the target cell, the configuration parameter of the DRB established between the UE and the target cell is used to indicate a transmission channel and a physical channel occupied by the DRB established between the UE and the target cell, and transmission channels and physical channels occupied by the K DRBs established between the UE and the target cell are different from a transmission channel and a physical channel occupied by at least one of the N DRBs except the K DRBs.

With reference to any one of the fifth aspect, or the first to the fourth possible implementations of the fifth aspect, in a sixth possible implementation of the fifth aspect, after the base station establishes the SRB with the UE according to the configuration parameter of the SRB, the method further includes:

when the UE needs to transmit control data in a target cell, sending, by the base station, a second setup command to the UE by using the SRB, where the second setup command includes a configuration parameter of an SRB established between the UE and the target cell, and the target cell is a cell to which the SRB is to be handed over; and the configuration parameter of the SRB established between the UE and the target cell is used to indicate a transmission channel and a physical channel occupied by the SRB established between the UE and the target cell, and the transmission channel and the physical channel occupied by the SRB established between the UE and the target cell are different from the transmission channel and the physical channel occupied by the at least one of the N DRBs.

According to a sixth aspect, an embodiment of the present invention further provides a radio bearer setup method, including:

establishing, by user equipment UE, an SRB with a base station according to a configuration parameter of the SRB, where the configuration parameter of the SRB is used to indicate a transmission channel and a physical channel occupied by the SRB; and establishing, by the UE according to configuration parameters of N DRBs that carry N services, the N DRBs with the base station, where N is an integer greater than or equal to 2, and the configuration parameters of the N DRBs are used to indicate transmission channels and physical channels occupied by the N DRBs; and M of the N DRBs occupy different transmission channels and different physical channels, M is an integer greater than or equal to 2 and less than or equal to N, and the transmission channel and the physical channel occupied by the SRB are different from a transmission channel and a physical channel occupied by at least one of the N DRBs.

In a first possible implementation of the sixth aspect, before the UE establishes the SRB with the base station according to the configuration parameter of the SRB, the method further includes:

receiving, by the UE, the configuration parameter of the SRB and the configuration parameters of the N DRBs that are sent by the base station.

In a second possible implementation of the sixth aspect, before the UE establishes the N DRBs with the base station according to the configuration parameters of the N DRBs, the method further includes:

receiving, by the UE by using the SRB, the configuration parameters that are of the N DRBs and that are sent by the base station.

With reference to the sixth aspect, the first possible implementation of the sixth aspect, or the second possible implementation of the sixth aspect, in a third possible implementation of the sixth aspect, M cells that respectively establish the M DRBs with the UE are different.

With reference to the third possible implementation of the sixth aspect, in a fourth possible implementation of the sixth aspect, RATs of the M cells that respectively establish the M DRBs with the UE are different.

With reference to any one of the sixth aspect, or the first to the fourth possible implementations of the sixth aspect, in a fifth possible implementation of the sixth aspect, after the UE establishes the N DRBs with the base station according to the configuration parameters of the N DRBs, the method further includes:

receiving, by the UE by using the SRB, a first setup command sent by the base station, where the first setup command includes a configuration parameter of a DRB established between the UE and a target cell, the target cell is a cell to which K of the N DRBs are to be handed over, $1 \leq K < N$, K is an integer, and the configuration parameter of the DRB established between the UE and the target cell is used to indicate transmission channels and physical channels occupied by the K DRBs established between the UE and the target cell; and establishing, by the UE, the K DRBs with the target cell according to the first setup command, where the transmission channels and the physical channels occupied by the K DRBs established between the UE and the target cell are different from a transmission channel and a physical channel occupied by at least one of the N DRBs except the K DRBs.

With reference to any one of the sixth aspect, or the first to the fourth possible implementations of the sixth aspect, in a sixth possible implementation of the sixth aspect, after the UE establishes the SRB with the base station according to the configuration parameter of the SRB, the method further includes:

receiving, by the UE by using the SRB, a second setup command sent by the base station, where the second setup command includes a configuration parameter of an SRB established between the UE and a target cell, the target cell is a cell to which the SRB is to be handed over, and the configuration parameter of the SRB established between the UE and the target cell is used to indicate a transmission channel and a physical channel occupied by the SRB established between the UE and the target cell; and establishing, by the UE, the SRB with the target cell according to the second setup command, where the transmission channel and the physical channel occupied by the SRB established between the UE and the target cell are different from the transmission channel and the physical channel occupied by the at least one of the N DRBs.

According to the radio bearer setup method and the device provided in the embodiments of the present invention, when a base station and UE establish a radio bearer, M DRBs of the UE occupy different transmission channels and different physical channels. Therefore, DRBs of same UE are separated. In a cell that the UE accesses, configurations of all DRBs do not change at the same time when one or some of the DRBs change. In this way, interruption in all service data between the UE and the base station and a call drop in a communication connection are avoided, thereby enhancing user experience, reducing a time delay, and improving a network throughput.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

Figure 1:
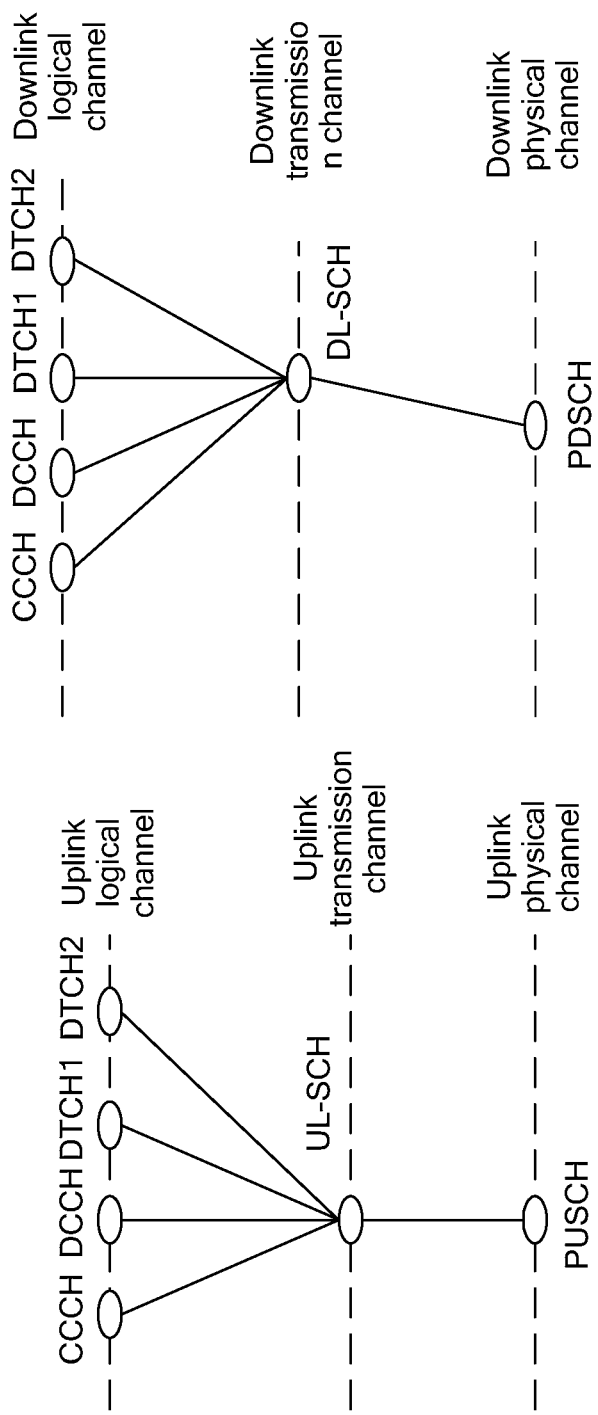
FIG. 1 is a diagram of a mapping relationship between a logical channel, a transmission channel, and a physical channel in the prior art.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions in the present invention may be applied to various wireless communications systems, for example, a Global System for Mobile Communications (Global System for Mobile Communications, GSM for short), a general packet radio service (General Packet Radio Service, GPRS for short) system, a Code Division Multiple Access (Code Division Multiple Access, CDMA for short) system, a CDMA2000 system, a Wideband Code Division Multiple Access (Wideband Code Division Multiple Access, WCDMA for short) system, a Long Term Evolution (Long Term Evolution, LTE for short) system, or a Worldwide Interoperability for Microwave Access (World Interoperability for Microwave Access, WiMAX for short) system. A base station may be a base station controller (Base Station Controller, BSC for short) in the GSM system, the GPRS system, or the CDMA system, or may be an evolved NodeB (Evolved NodeB, eNB for short) in the LTE system, or may be a network element such as an access service network base station (Access Service Network Base Station, ASN BS for short) in a WiMAX network. UE may be a device such as a mobile phone or a tablet computer.

A logical channel, a transmission channel, and a physical channel are described herein.

The logical channel provides a data transmission service for a radio bearer (that is, an SRB and a DRB, where the SRB is a radio bearer for transmitting control data, and the DRB is a radio bearer for transmitting service data). The logical channel may be classified into a control logical channel and a service logical channel. The control logical channel is used to carry control data (that is, control signaling on an SRB), and the service logical channel is used to carry service data (that is, service data on a DRB). Service data in the embodiments of the present invention includes an SMS message, a voice, various multimedia services, and the like, but does not include a broadcast service. That is, the service data in the embodiments is described for one UE, and the broadcast service is described for a group of UEs (that is, multiple UEs).

The transmission channel is used to define a manner and a characteristic (for example, a transmission rate, an error rate, or a time delay) for transmitting data over an air interface. The physical channel defines a physical resource for transmitting data over an air interface, and the physical resource may specifically include a carrier, a scrambling code, a channelization code (optional), a start and end time (duration), and the like.

The logical channel is used to define a type of transmitted data. Therefore, data (control signaling or service data) transmitted between a base station and UE is first carried on a corresponding logical channel. The data carried on the logical channel may be an independent block of data streams, or may be mixed data streams that have a specified start bit. The logical channel that carries the data is multiplexed to the transmission channel, that is, particular processing is performed on and indication information such as a transmission format is added to the data carried on the logical channel. Then, the transmission channel that carries the data is multiplexed to the physical channel, that is, a carrier, a scrambling code, a spreading code, a start and end time of the data carried on the transmission channel are determined according to UE to which the data belongs and a function of the data, a related operation is performed, and finally, the data is modulated into an analog radio frequency signal for transmission.

FIG. 1 is a diagram of a mapping relationship between a logical channel, a transmission channel, and a physical channel in the prior art. As shown in FIG. 1, a logical channel occupied by an SRB includes a common control channel (English: Common Control Channel, CCCH for short) and a dedicated control channel (English: Dedicated Control Channel, DCCH for short). A logical channel occupied by a DRB includes a dedicated traffic channel (English: Dedicated Traffic Channel, DTCH for short). If there are multiple services, for example, a service 1 and a service 2, a logical channel occupied by a DRB corresponding to the service 1 is a DTCH1, and a logical channel occupied by a DRB corresponding to the service 2 is a DTCH2. When the logical channel is multiplexed to the transmission channel, the CCCH, the DCCH, the DTCH1, and the DTCH2 are multiplexed to a same transmission channel, that is, a shared channel (English: Share Channel, SCH for short). In an uplink, the CCCH, the DCCH, the DTCH1, and the DTCH2 are multiplexed to a same uplink shared channel (English: Uplink-Shared Channel, UL-SCH for short). In a downlink, the CCCH, the DCCH, the DTCH1, and the DTCH2 are multiplexed to a same downlink shared channel (English: Downlink-Share Channel, DL-SCH for short). When the transmission channel is multiplexed to the physical channel, the SCH is multiplexed to a physical shared channel (English: Physical Share Channel, PSCH for short). In an uplink, the UL-SCH is multiplexed to a physical uplink shared channel (English: Uplink Physical Share Channel, PUSCH for short). In a downlink, the DL-SCH is multiplexed to a physical downlink shared channel (English: Downlink Physical Share Channel, PDSCH for short).

Therefore, logical channels occupied by all DRBs corresponding to all services are generally different. However, the logical channels occupied by all the DRBs are generally multiplexed to a same occupied transmission channel. For example, all of transmission rates, error rates, and time delays of the transmission channels are the same. In addition, the occupied transmission channels to which all the DRBs are multiplexed are generally multiplexed to a same occupied physical channel. For example, all of carriers, scrambling codes, channelization codes (optional), and start and end times (duration) of physical channels are the same. A manner of occupying a transmission channel by each DRB may be: data transmission of each DRB is multiplexed to a transmission channel in a scheduling manner. A manner of occupying a physical channel by each DRB may be: data transmission of each DRB is multiplexed to a physical channel in a scheduling manner. Therefore, when a configuration of one or some of the DRBs changes, because QoS requirements of all the DRBs cannot be met at the same time, all the DRBs may need to be re-configured. Consequently, user experience may not be ensured.

Figure 2:
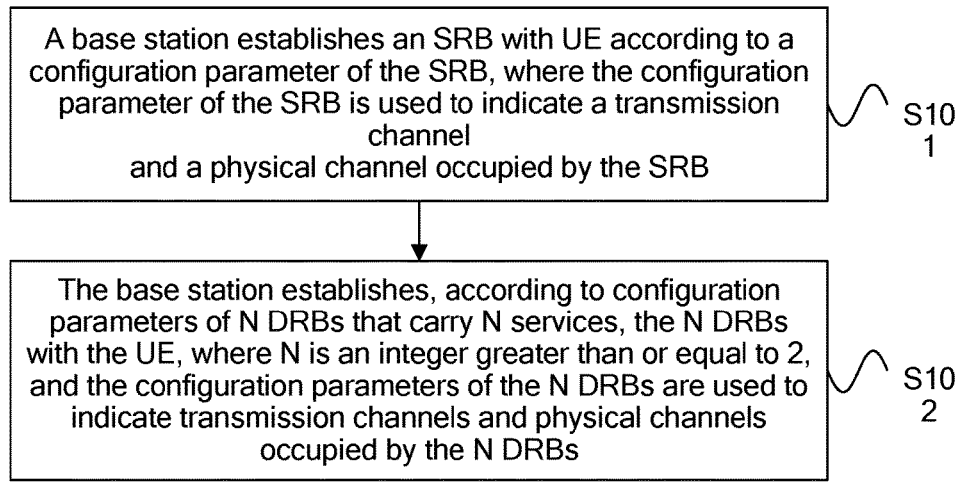
FIG. 2 is a flowchart of Embodiment 1 of a radio bearer setup method according to the present invention.

FIG. 2 is a flowchart of Embodiment 1 of a radio bearer setup method according to the present invention. As shown in FIG. 2, the method in this embodiment may include the following steps:

S101. A base station establishes an SRB with user equipment UE according to a configuration parameter of the SRB, where the configuration parameter of the SRB is used to indicate a transmission channel and a physical channel occupied by the SRB.

S102. The base station establishes, according to configuration parameters of N DRBs that carry N services, the N DRBs with the UE, where N is an integer greater than or equal to 2, and the configuration parameters of the N DRBs are used to indicate transmission channels and physical channels occupied by the N DRBs.

In this embodiment, the base station establishes the SRB with the UE according to the configuration parameter of the SRB. The SRB of the UE is in a cell controlled by the base station, that is, the UE establishes the SRB with the cell controlled by the base station. The base station may further establish the N DRBs with the UE according to the configuration parameters of the N DRBs that carry the N services. The N DRBs of the UE are in the cell controlled by the base station, that is, the UE establishes the N DRBs with the cell controlled by the base station. The UE may establish the N DRBs with at least one cell controlled by the base station, and the UE may establish at least one DRB with the cell. The SRB and the N DRBs may be in a same cell controlled by the base station, or may be in different cells controlled by the base station. The N DRBs may be in a same cell controlled by the base station, or may be in different cells controlled by the base station.

Regardless of whether the N DRBs are in a same cell or different cells controlled by the base station, transmission channels occupied by M of the N DRBs are different. For example, at least one of transmission rates, error rates, or time delays of the M DRBs are different. Physical channels occupied by the M of the N DRBs are different. For example, at least one of timeslots, or frequencies occupied by the M DRBs are different. The M of the N DRBs occupy different transmission channels and different physical channels, thereby implementing DRB separation. Therefore, user experience degrading is avoided that occurs when configurations of all the DRBs change because of a change of one or some of the N DRBs. Data of each DRB is transmitted on a respective transmission channel and a respective physical channel, and a respective QoS requirement may be met. For example, N is 3. Two of the three DRBs occupy different transmission channels and different physical channels, that is, a transmission channel and a physical channel occupied by one of the three DRBs are different from transmission channels and physical channels occupied by the other two DRBs. Alternatively, three of the three DRBs occupy different transmission channels and different physical channels, that is, transmission channels occupied by all of the three DRBs are different and physical channels occupied by all of the three DRBs are different.

Regardless of whether the SRB and at least one of the N DRBs are in a same cell or different cells controlled by the base station, the transmission channel occupied by the SRB is different from a transmission channel occupied by the at least one of the N DRBs. For example, at least one of transmission rates, error rates, or time delays of the SRB and the at least one of the N DRBs are different. The physical channel occupied by the SRB is different from a physical channel occupied by the at least one of the N DRBs. For example, at least one of timeslots, or frequencies occupied by the SRB and the at least one of the N DRBs are different. The SRB and the DRB of the UE occupy different transmission channels and different physical channels, thereby implementing SRB and DRB separation. A configuration of the DRB is not affected when a configuration of the SRB changes, and therefore, user experience degrading is avoided that occurs when the configuration of the DRB changes because of the configuration change of the SRB. Data of the SRB and data of the DRB are transmitted on respective transmission channels and respective physical channels, and respective QoS requirements may be met. For example, N is 3. The transmission channel and the physical channel occupied by the SRB may be different from a transmission channel and a physical channel occupied by one of the three DRBs, that is, the transmission channel and the physical channel occupied by the SRB are the same as transmission channels and physical channels occupied by two of the three DRBs, but are different from a transmission channel and a physical channel occupied by the remaining DRB in the three DRBs. Alternatively, the transmission channel and the physical channel occupied by the SRB are different from transmission channels and physical channels occupied by two of the three DRBs, but are the same as a transmission channel and a physical channel occupied by the remaining DRB in the three DRBs. Alternatively, the transmission channel and the physical channel occupied by the SRB are different from a transmission channel and a physical channel occupied by each of the three DRBs.

For example, if the UE needs to establish two services that are respectively a voice and web page browsing, a DRB1 and a DRB2 are established. Transmission channels occupied by the DRB1 and the DRB2 are different. For example, transmission rates allocated to the DRB1 and the DRB2 are different, error rates allocated to the DRB1 and the DRB2 are different, or time delays allocated to the DRB1 and the DRB2 are different. Physical channels occupied by the DRB1 and the DRB2 are different. For example, frequencies allocated to the DRB1 and the DRB2 are different.

Therefore, when a configuration of one or some of the DRBs of the UE changes, a transmission channel and a physical channel occupied by only the one or the some of the DRBs need to be re-configured, and a transmission channel and physical channels occupied by other DRBs of the UE may not need to be re-configured. In this way, the DRBs do not affect each other, and interruption in all service data between the UE and the base station and a call drop in a communication connection are avoided, thereby reducing a time delay and improving a network throughput. In addition, because all the DRBs have different QoS requirements, when all the DRBs are separated, the QoS requirements of all the DRBs can be more flexibly ensured, and do not affect each other, thereby improving flexibility of data transmission in an UP connection and a network throughput.

Figure 3:
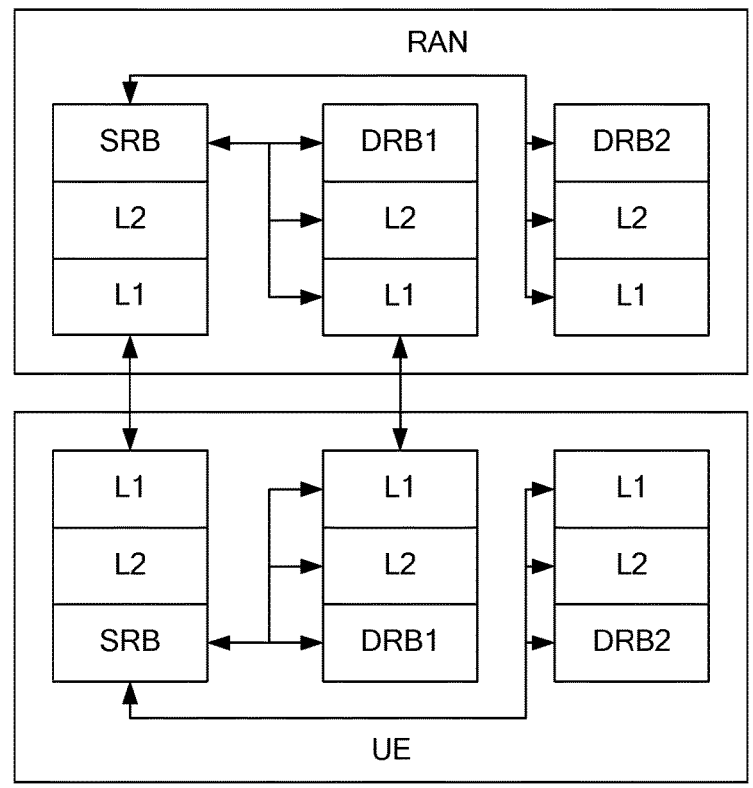
FIG. 3 is a first schematic diagram of a protocol stack of an air interface according to an embodiment of the present invention.

FIG. 3 is a first schematic diagram of a protocol stack of an air interface according to an embodiment of the present invention. As shown in FIG. 3, two DRBs (that is, a DRB1 and a DRB2) are used as an example for description. An SRB, the DRB1, and the DRB2 occupy different channels at a layer (Layer, L for short) 2 and an L1, that is, the SRB, the DRB1, and the DRB2 occupy different transmission channels and different physical channels. It means that all DRBs between the UE and a radio access network (English: Radio Access Network, RAN for short) (for example, a base station) are configured on different transmission channels and different physical channels. In addition, the SRB and all the DRBs are configured on different transmission channels and different physical channels. The SRB carries radio signaling data, and the radio signaling data includes L3 signaling (including DRB-related signaling) such as radio resource control (English: Radio Resource Control, RRC for short) protocol signaling and NAS signaling. The DRB carries radio service data. The L2 is a Packet Data Convergence Protocol (English: Packet Data Convergence Protocol, PDCP for short)/Radio Link Control (English: Radio Link Control, RLC for short)/MAC layer, and the L1 is a physical layer (English: Physical Layer).

Optionally, M cells that separately establish the M DRBs with the UE may be a same cell, or may be different cells controlled by a same base station, or some of M cells that establish the M DRBs with the UE may be a same cell. A cell that establishes the SRB with the UE and a cell that establishes the at least one of the N DRBs with the UE may be a same cell, or may be different cells controlled by a same base station.

Optionally, radio access technologies (English: Radio Access Technology, RAT for short) of the cells that separately establish the M DRBs with the UE are the same. For example, the UE separately establishes the M DRBs with different cells in a same system, and the M DRBs of the UE are separately configured on different transmission channels and different physical channels. RATs of the cell that establishes the SRB with the UE and the cell that establishes the at least one of the N DRBs with the UE are the same. For example, the UE separately establishes the SRB and the at least one DRB with different cells in a same system, and the SRB and the at least one DRB of the UE are configured on different transmission channels and different physical channels.

Figure 4:
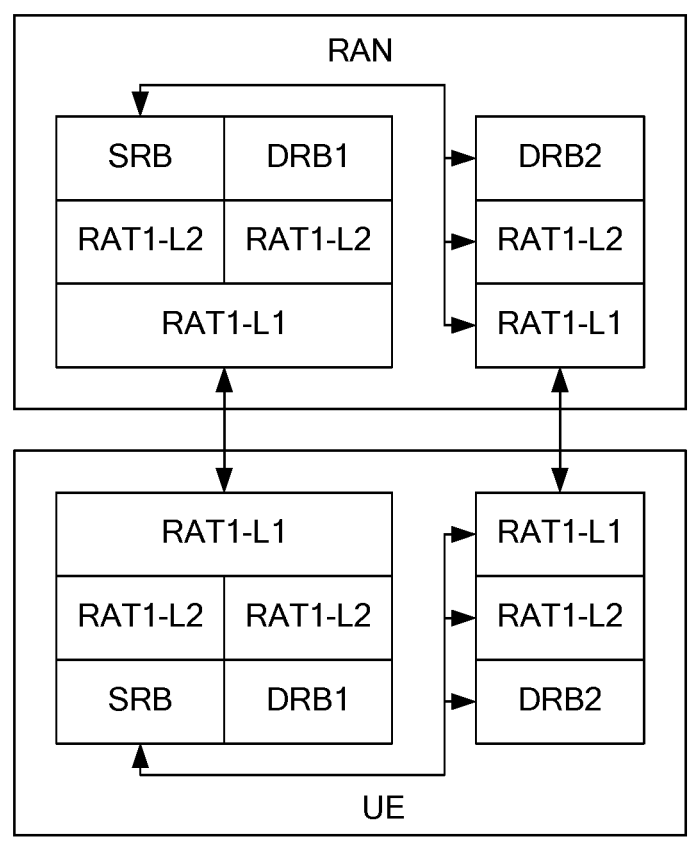
FIG. 4 is a second schematic diagram of a protocol stack of an air interface according to an embodiment of the present invention.

As shown in FIG. 4, RATs of the cell that establishes the SRB with the UE, a cell that establishes the DRB1 with the UE, and a cell that establishes the DRB2 with the UE are the same. The cell that establishes the SRB with the UE and the cell that establishes the DRB1 with the UE are a same cell. However, the cell that establishes the SRB with the UE and the cell that establishes the DRB2 with the UE are not a same cell.

Optionally, RATs of the M cells that respectively establish the M DRBs with the UE are different. For example, the UE separately establishes the M DRBs with cells in different systems, and the M DRBs of the UE are separately configured on different transmission channels and different physical channels. RATs of the cell that establishes the SRB with the UE and the cell that establishes the at least one of the N DRBs with the UE are different. For example, the UE separately establishes the SRB and the at least one DRB with cells in different systems, and the SRB and the at least one DRB of the UE are configured on different transmission channels and different physical channels.

Figure 5:
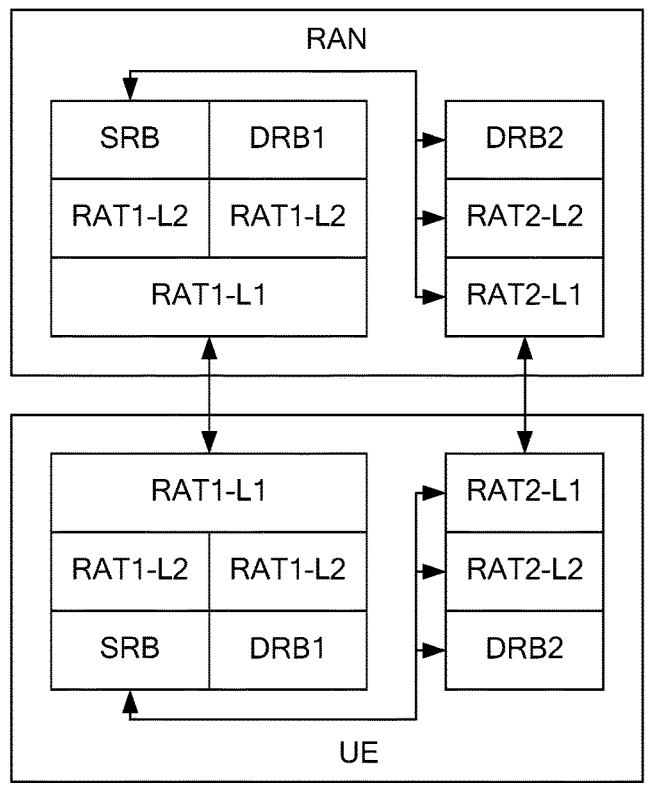
FIG. 5 is a third schematic diagram of a protocol stack of an air interface according to an embodiment of the present invention.

As shown in FIG. 5, RATs of the cell that establishes the SRB with the UE and the cell that establishes the DRB1 with the UE are the same, and the RAT is a RAT1. RATs of the cell that establishes the SRB with the UE and the cell that establishes the DRB2 with the UE are different, and a RAT of the cell that establishes the DRB2 with the UE is a RAT2.

According to the radio bearer setup method provided in this embodiment of the present invention, when a base station and UE establish a radio bearer, M DRBs of the UE occupy different transmission channels and different physical channels. Therefore, DRBs of same UE are separated. In a cell that the UE accesses, configurations of all DRBs do not change at the same time when one or some of the DRBs change. In this way, interruption in all service data between the UE and the base station and a call drop in a communication connection are avoided, thereby enhancing user experience, reducing a time delay, improving a network throughput, and further improving flexibility of data transmission in an UP connection.

Figure 6:
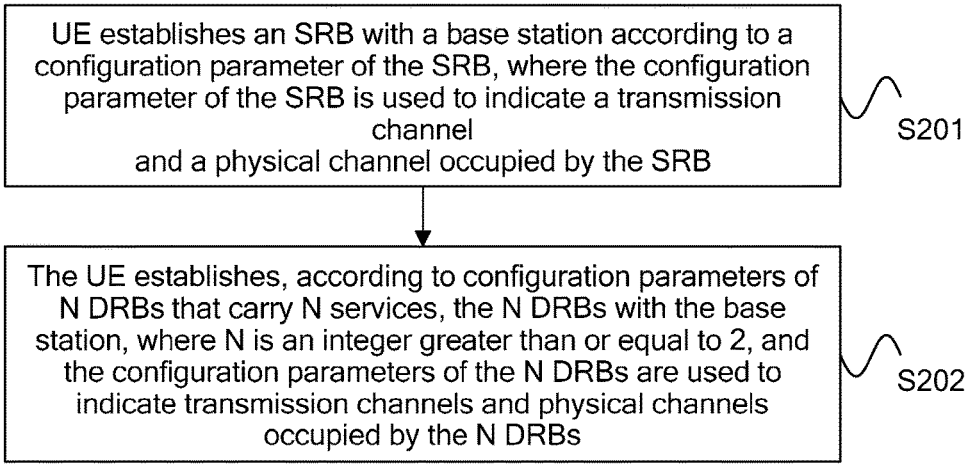
FIG. 6 is a flowchart of Embodiment 2 of a radio bearer setup method according to the present invention.

FIG. 6 is a flowchart of Embodiment 2 of a radio bearer setup method according to the present invention. As shown in FIG. 6, the method in this embodiment may include the following steps:

S201. UE establishes an SRB with a base station according to a configuration parameter of the SRB, where the configuration parameter of the SRB is used to indicate a transmission channel and a physical channel occupied by the SRB.

S202. The UE establishes, according to configuration parameters of N DRBs that carry N services, the N DRBs with the base station, where N is an integer greater than or equal to 2, and the configuration parameters of the N DRBs are used to indicate transmission channels and physical channels occupied by the N DRBs.

In this embodiment, the UE establishes the SRB with the base station according to the configuration parameter of the SRB. The SRB of the UE is in a cell controlled by the base station, that is, the UE establishes the SRB with the cell controlled by the base station. The UE may further establish the N DRBs with the base station according to the configuration parameters of the N DRBs that carry the N services. The DRBs of the UE are in the cell controlled by the base station, that is, the UE establishes the N DRBs with the cell controlled by the base station. The SRB and the N DRBs may be in a same cell controlled by the base station, or may be in different cells controlled by the base station.

Regardless of whether the N DRBs are in a same cell or different cells controlled by the base station, transmission channels occupied by M of the N DRBs are different. For example, at least one of transmission rates, error rates, or time delays of the M DRBs are different. Physical channels occupied by the M of the N DRBs are different. For example, at least one of timeslots, or frequencies occupied by the M DRBs are different. The M of the N DRBs occupy different transmission channels and different physical channels, thereby implementing DRB separation. Data of each DRB is transmitted on a respective transmission channel and a respective physical channel, and a respective QoS requirement may be met. For example, N is 3. Two of the three DRBs occupy different transmission channels and different physical channels, that is, a transmission channel and a physical channel occupied by one of the three DRBs are different from transmission channels and physical channels occupied by the other two DRBs. Alternatively, three of the three DRBs occupy different transmission channels and different physical channels, that is, transmission channels occupied by all of the three DRBs are different and physical channels occupied by all of the three DRBs are different.

Regardless of whether the SRB and at least one of the N DRBs are in a same cell or different cells controlled by the base station, the transmission channel occupied by the SRB is different from a transmission channel occupied by the at least one of the N DRBs. For example, at least one of transmission rates, error rates, or time delays of the SRB and the at least one of the N DRBs are different. The physical channel occupied by the SRB is different from a physical channel occupied by the at least one of the N DRBs. For example, at least one of timeslots, or frequencies occupied by the SRB and the at least one of the N DRBs are different. The SRB and the DRB of the UE occupy different transmission channels and different physical channels, thereby implementing SRB and DRB separation. Data of the SRB and data of the DRB are transmitted on respective transmission channels and respective physical channels, and respective QoS requirements may be met. For example, N is 3. The transmission channel and the physical channel occupied by the SRB may be different from a transmission channel and a physical channel occupied by one of the three DRBs, that is, the transmission channel and the physical channel occupied by the SRB are the same as transmission channels and physical channels occupied by two of the three DRBs, but are different from a transmission channel and a physical channel occupied by the remaining DRB in the three DRBs. Alternatively, the transmission channel and the physical channel occupied by the SRB are different from transmission channels and physical channels occupied by two of the three DRBs, but are the same as a transmission channel and a physical channel occupied by the remaining DRB in the three DRBs. Alternatively, the transmission channel and the physical channel occupied by the SRB are different from a transmission channel and a physical channel occupied by each of the three DRBs.

Therefore, when a configuration of one or some of the DRBs of the UE changes, a transmission channel and a physical channel occupied by only the one or the some of the DRBs need to be re-configured, and a transmission channel and physical channels occupied by other DRBs of the UE may not need to be re-configured. In this way, the DRBs do not affect each other, and interruption in all service data between the UE and the base station and a call drop in a communication connection are avoided, thereby reducing a time delay and improving a network throughput. In addition, because all the DRBs have different QoS requirements, when all the DRBs are separated, the QoS requirements of all the DRBs can be more flexibly ensured, and do not affect each other, thereby improving flexibility of data transmission in an UP connection and a network throughput.

Optionally, cells that separately establish the M DRBs with the UE may be a same cell, or may be different cells controlled by a same base station, or some of M cells that establish the M DRBs with the UE may be a same cell. A cell that establishes the SRB with the UE and a cell that establishes the at least one of the N DRBs with the UE may be a same cell, or may be different cells controlled by a same base station.

Optionally, RATs of the cells that separately establish the M DRBs with the UE are the same. As shown in FIG. 4, for details, refer to a related record in the method embodiment 1 of the present invention.

Optionally, RATs of the M cells that respectively establish the M DRBs with the UE are different. As shown in FIG. 5, for details, refer to a related record in the method embodiment 1 of the present invention.

According to the radio bearer setup method provided in this embodiment of the present invention, when UE and a base station establish a radio bearer, M DRBs of the UE occupy different transmission channels and different physical channels. Therefore, DRBs of same UE are separated. In a cell that the UE accesses, configurations of all DRBs do not change at the same time when one or some of the DRBs change. In this way, interruption in all service data between the UE and the base station and a call drop in a communication connection are avoided, thereby enhancing user experience, reducing a time delay, improving a network throughput, and further improving flexibility of data transmission in an UP connection.

Figure 7:
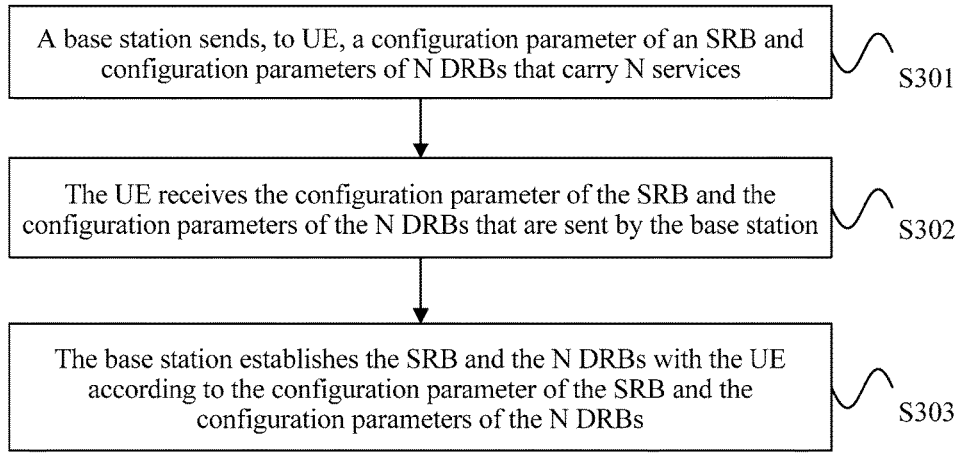
FIG. 7 is a flowchart of Embodiment 3 of a radio bearer setup method according to the present invention.

FIG. 7 is a flowchart of Embodiment 3 of a radio bearer setup method according to the present invention. As shown in FIG. 7, the method in this embodiment includes the following steps:

S301. A base station sends, to UE, a configuration parameter of an SRB and configuration parameters of N DRBs that carry N services.

S302. The UE receives the configuration parameter of the SRB and the configuration parameters of the N DRBs that are sent by the base station.

S303. The base station establishes the SRB and the N DRBs with the UE according to the configuration parameter of the SRB and the configuration parameters of the N DRBs.

In this embodiment, the base station may determine the configuration parameter of the SRB of the UE in a random access process of the UE, so as to establish the SRB. The UE and a core network device perform a service negotiation process when the UE needs to perform a service. After the service negotiation process is completed, the core network device instructs the base station to establish the N DRBs that are of the UE and that carry the N services, and then the base station determines the configuration parameters of the N DRBs. For example, the core network device sends radio access bearer indication information to the base station. The radio access bearer indication information may include service QoS information such as a rate, a time delay, and an error rate of establishing a radio access bearer of the UE. The base station determines the configuration parameters of the N DRBs of the UE according to the radio access bearer indication information sent by the core network device, where M of the N DRBs occupy different transmission channels and different physical channels. Therefore, in this embodiment, the configuration parameter that is of the SRB and that is determined by the base station is used to indicate a transmission channel and a physical channel occupied by the SRB. Further, the configuration parameter of the SRB is used to indicate a logical channel occupied by the SRB. A configuration parameter of each DRB in the configuration parameters that are of the N DRBs and that are determined by the base station is used to indicate a transmission channel and a physical channel occupied by the DRB. Further, the configuration parameter of each DRB is used to indicate a logical channel occupied by the DRB. It should be noted that, logical channels occupied by all of the N DRBs are different, and the M of the N DRBs occupy different transmission channels and different physical channels. The base station separately configures the M of the N DRBs on different transmission channels and different physical channels, and therefore, DRBs of the UE are separated.

Optionally, if the base station determines that the SRB and the N DRBs are in a same cell (for example, a first cell), the first cell controlled by the base station determines the configuration parameter of the SRB of the UE and the configuration parameters of the N DRBs. Therefore, the SRB and the N DRBs established by the UE are in a same cell.

Optionally, the base station determines that the SRB and the N DRBs are in different cells. For example, the SRB is in a first cell controlled by the base station, a DRB1 is in a second cell controlled by the base station, and a DRB2 is in a third cell controlled by the base station. After the first cell determines the configuration parameter of the SRB of the UE, the first cell determines that the DRB1 needs to be in the second cell controlled by the base station and the DRB2 needs to be in the third cell controlled by the base station. In this case, the first cell sends a DRB1 setup request of the UE to the second cell and sends a DRB2 setup request to the third cell. The second cell determines a configuration parameter of the DRB1 of the UE according to the DRB1 setup request of the UE sent by the first cell, and the third cell determines a configuration parameter of the DRB2 of the UE according to the DRB2 setup request of the UE sent by the first cell. For example, the first cell sends the radio access bearer indication information received from the core network device to the second cell and the third cell. The radio access bearer indication information may include QoS information such as a rate, a time delay, and an error rate of establishing a DRB of the UE. The second cell determines the configuration parameter of the DRB1 of the UE according to the radio access bearer indication information, and the second cell adds the configuration parameter of the DRB1 of the UE to a DRB1 setup response of the UE and sends the DRB1 setup response to the first cell. The first cell obtains the configuration parameter of the DRB1 of the UE from the DRB1 setup response of the UE. The third cell determines the configuration parameter of the DRB2 of the UE according to the radio access bearer indication information, and the third cell adds the configuration parameter of the DRB2 of the UE to a DRB2 setup response of the UE and sends the DRB2 setup response to the first cell. The first cell obtains the configuration parameter of the DRB2 of the UE from the DRB2 setup response of the UE. Therefore, the SRB established by the UE is in the first cell, the DRB1 established by the UE is in the second cell, and the DRB2 established by the UE is in the third cell.

In this embodiment, after the base station determines the configuration parameter of the SRB of the UE and the configuration parameters of the N DRBs, the base station may generate a radio resource configuration message according to the configuration parameter of the SRB of the UE and the configuration parameters of the N DRBs. The radio resource configuration message includes the configuration parameter of the SRB and the configuration parameters of the N DRBs. Then, the base station sends the radio resource configuration message to the UE by using a common connection. Therefore, the UE obtains the configuration parameter of the SRB and the configuration parameters of the N DRBs from the radio resource configuration message after receiving the radio resource configuration message. Then, the UE establishes the SRB and the N DRBs with the base station according to the configuration parameter of the SRB and the configuration parameters of the N DRBs. The base station also establishes the SRB and the N DRBs with the UE according to the configuration parameter of the SRB and the configuration parameters of the N DRBs that are sent to the UE. In this way, the M of the N DRBs established by the UE occupy different transmission channels and different physical channels, and therefore, DRBs of the UE are separated.

The following describes the configuration parameter of the SRB of the UE and the configuration parameters of the N DRBs by using an example. The following shows information elements that indicate the configuration parameter of the SRB of the UE and the configuration parameters of the N DRBs and that are in the radio resource configuration message. mac-MainConfig for SRB is a transmission channel parameter for SRB configuration, mac-MainConfig for DRB is a transmission channel parameter for DRB configuration, PhysicalconfigDedicated for SRB is a physical channel parameter for SRB configuration, and PhysicalconfigDedicated for DRB is a physical channel parameter for DRB configuration. Another part is consistent with that in the prior art, and details are not described herein.

S402. The UE receives the configuration parameter that is of the SRB and that is sent by the base station.

S403. The base station establishes the SRB with the UE according to the configuration parameter of the SRB.

In this embodiment, the UE may establish the SRB of the UE in a random access process. The base station determines the configuration parameter of the SRB of the UE in the random access process of the UE. The configuration parameter of the SRB is used to indicate a transmission channel and a physical channel occupied by the SRB, and may further indicate a logical channel occupied by the SRB. Then, the base station may send the determined configuration parameter of the SRB to the UE by using a radio resource configuration message, and the UE may establish the SRB with the base station according to the configuration parameter of the SRB.

```
    -- ASN1START
    RadioResourceConfigDedicated ::=      SEQUENCE {
        srb-ToAddModList                  SRB-ToAddModList
    OPTIONAL,       -- Cond HO-Conn
        drb-ToAddModList                  DRB-ToAddModList
    OPTIONAL,       -- Cond HO-toEUTRA
        drb-ToReleaseList                 DRB-ToReleaseList
    OPTIONAL,       -- Need ON
        mac-MainConfig for SRB                CHOICE {
            explicitValue                 MAC-MainConfig,
            defaultValue                  NULL
        }      OPTIONAL,                  --          Cond
HO-toEUTRA2
        mac-MainConfigListforDRB          MAC-MainConfigListforDRB
    OPTIONAL,--Cond
        sps-Config                        SPS-Config
    OPTIONAL,       -- Need ON
        physicalConfigDedicated for SRB   PhysicalConfigDedicated
    OPTIONAL,       -- Need ON
        physicalConfigDedicatedListforDRB
    PhysicalConfigDedicatedListforDRB     OPTIONAL,-- Need ON
        ...,
        [[  rlf-TimersAndConstants-r9     RLF-TimersAndConstants-r9
        OPTIONAL -- Need ON
        ]]
    }MAC-MainConfigListforDRB ::=         SEQUENCE (SIZE (1..maxDRB))
OF mac-MainConfigforDRB
        mac-MainConfigforDRB                  CHOICE {
            explicitValue                 MAC-MainConfig,
            defaultValue                  NULL
        }      OPTIONAL,                  --          Cond
HO-toEUTRA2
        PhysicalConfigDedicatedListforDRB ::=SEQUENCE (SIZE (1..maxDRB))
OF physicalConfigDedicated
```

According to the radio bearer setup method provided in this embodiment, when a base station and UE establish a radio bearer, at least two of N DRBs of the UE occupy different transmission channels and different physical channels. Therefore, DRBs of same UE are separated. In a cell that the UE accesses, configurations of all DRBs do not change at the same time when one or some of the DRBs change. In this way, interruption in all service data between the UE and the base station and a call drop in a communication connection are avoided, thereby enhancing user experience, reducing a time delay, improving a network throughput, and further improving flexibility of data transmission in an UP connection.

Figure 8:
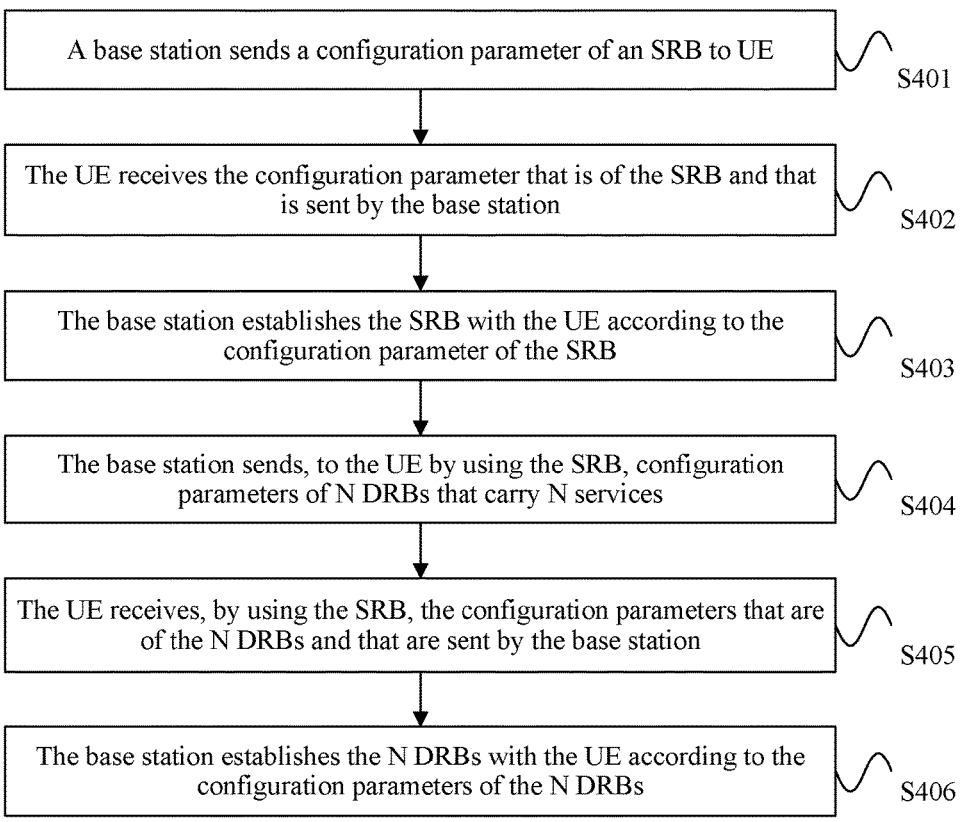
FIG. 8 is a flowchart of Embodiment 4 of a radio bearer setup method according to the present invention.

FIG. 8 is a flowchart of Embodiment 4 of a radio bearer setup method according to the present invention. As shown in FIG. 8, the method in this embodiment includes the following steps.

S401. A base station sends a configuration parameter of an SRB to UE.

S404. The base station sends, to the UE by using the SRB, configuration parameters of N DRBs that carry N services.

S405. The UE receives, by using the SRB, the configuration parameters that are of the N DRBs and that are sent by the base station.

S406. The base station establishes the N DRBs with the UE according to the configuration parameters of the N DRBs.

The UE and a core network device perform a service negotiation process when the UE needs to perform a service. After the service negotiation process is completed, the core network device instructs the base station to establish the N DRBs that are of the UE and that carry the N services, and then the base station determines the configuration parameters of the N DRBs. For example, the core network device sends radio access bearer indication information to the base station. The radio access bearer indication information may include service QoS information such as a rate, a time delay, and an error rate of establishing a DRB bearer of the UE.

The base station determines the configuration parameters of the N DRBs of the UE according to the radio access bearer indication information sent by the core network device, so as to establish the N DRBs, where M of the N DRBs occupy different transmission channels and different physical channels. In this embodiment, the configuration parameters that are of the N DRBs and that are determined by the base station are used to indicate transmission channels and physical channels occupied by the N DRBs, and may further indicate logical channels occupied by the N DRBs. The base station may add the configuration parameters of the N DRBs to another radio resource configuration message and send the another radio resource configuration message to the UE by using the established SRB. Correspondingly, the UE may receive, by using the SRB of the UE, the configuration parameters that are of the N DRBs and that are sent by the base station. Then, the base station may establish the N DRBs with the UE according to the configuration parameters of the N DRBs.

It should be noted that, the M of the N DRBs may be in a same cell or different cells controlled by the base station. The SRB of the UE and the DRB of the UE may be in a same cell or different cells controlled by the base station. For details, refer to a related record in the method embodiment 3 of the present invention. Details are not described herein again.

According to the radio bearer setup method provided in this embodiment, when a base station and UE establish a radio bearer, at least two of N DRBs of the UE occupy different transmission channels and different physical channels. Therefore, DRBs of same UE are separated. In a cell that the UE accesses, configurations of all DRBs do not change at the same time when one or some of the DRBs change. In this way, interruption in all service data between the UE and the base station and a call drop in a communication connection are avoided, thereby enhancing user experience, reducing a time delay, improving a network throughput, and further improving flexibility of data transmission in an UP connection.

Figure 9:
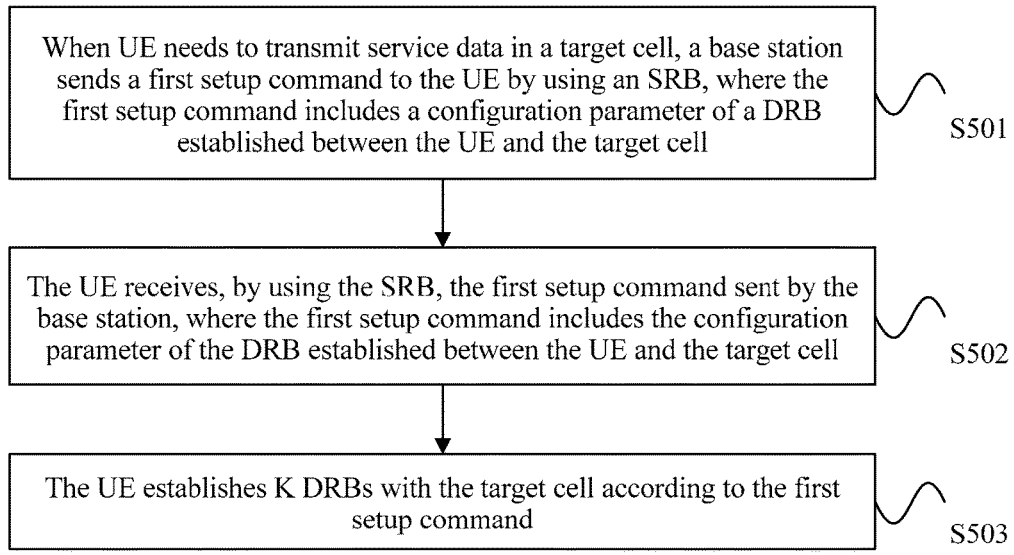
FIG. 9 is a flowchart of Embodiment 5 of a radio bearer setup method according to the present invention.

FIG. 9 is a flowchart of Embodiment 5 of a radio bearer setup method according to the present invention. As shown in FIG. 9, this embodiment is based on any one of method embodiments 1 to 4 of the present invention. After the base station establishes the N DRBs with the UE according to the configuration parameters of the N DRBs, the method in this embodiment may further include the following steps.

S501. When the UE needs to transmit service data in a target cell, the base station sends a first setup command to the UE by using the SRB, where the first setup command includes a configuration parameter of a DRB established between the UE and the target cell.

In this embodiment, because at least two DRBs of the UE occupy different transmission channels and different physical channels, the base station may re-establish K DRBs of the UE in the target cell. The target cell is a cell to which the K DRBs are to be handed over. A specific process is as follows:

When the UE needs to transmit the service data in the target cell, that is, the UE needs to establish the K DRBs with the target cell, the base station obtains the configuration parameter of the DRB established between the UE and the target cell. The configuration parameter of the DRB established between the UE and the target cell is used to indicate transmission channels and physical channels occupied by the K DRBs established between the UE and the target cell, and further indicate logical channels occupied by the K DRBs established between the UE and the target cell. In addition, the transmission channels and the physical channels occupied by the K DRBs established between the UE and the target cell are different from a transmission channel and a physical channel occupied by at least one of the N DRBs except the K DRBs. If the target cell is a cell controlled by the base station, the base station may determine the configuration parameter of the DRB established between the UE and the target cell. If the target cell is a cell controlled by another base station, the base station requests the base station that controls the target cell, to obtain the configuration parameter of the DRB established between the UE and the target cell. Then, the base station adds the configuration parameter of the DRB established between the UE and the target cell to the first setup command, and sends the first setup command to the UE by using the SRB.

S502. The UE receives, by using the SRB, the first setup command sent by the base station, where the first setup command includes the configuration parameter of the DRB established between the UE and the target cell.

S503. The UE establishes K DRBs with the target cell according to the first setup command.

In this embodiment, the UE receives, by using the SRB established with the base station, the first setup command sent by the base station. The UE obtains the configuration parameter of the DRB established between the UE and the target cell from the first setup command. Then, the UE establishes the K DRBs with the target cell according to the configuration parameter of the DRB established between the UE and the target cell. If the target cell is a cell controlled by the base station, the UE and the base station establish new K DRBs according to the configuration parameter of the DRB established between the UE and the target cell. If the target cell is a cell controlled by another base station, the UE and the another base station establish new K DRBs according to the configuration parameter of the DRB established between the UE and the target cell.

After the base station determines that the UE establishes the DRB with the target cell, the base station may release resources that are occupied by the K of the N DRBs and that are in a source cell. The source cell is a cell in which the K DRBs of the UE for a same service are located before the UE establishes the DRB with the target cell.

According to the radio bearer setup method provided in this embodiment of the present invention, when the base station determines that the UE needs to transmit service data in a target cell, the base station sends a first setup command to the UE by using the SRB. The first setup command includes a configuration parameter of a DRB established between the UE and the target cell. The UE establishes at least one DRB with the target cell according to the first setup command. Therefore, the at least one DRB of the UE may be independently re-established.

Figure 10:
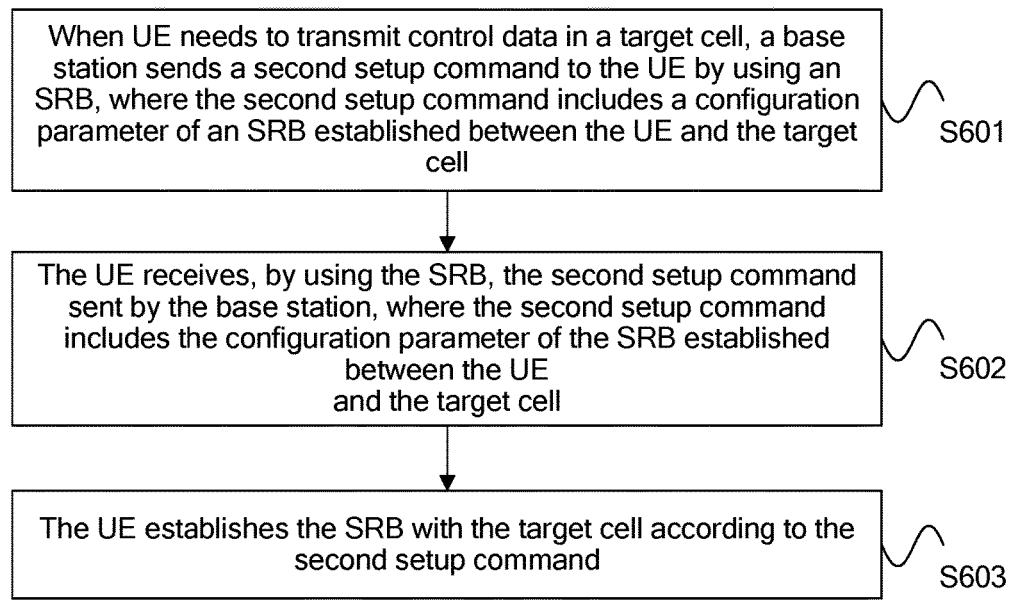
FIG. 10 is a flowchart of Embodiment 6 of a radio bearer setup method according to the present invention.

FIG. 10 is a flowchart of Embodiment 6 of a radio bearer setup method according to the present invention. As shown in FIG. 10, this embodiment is based on any one of method embodiments 1 to 4 of the present invention. After the base station establishes the SRB with the UE according to the configuration parameter of the SRB, the method in this embodiment may further include the following steps.

S601. When the UE needs to transmit control data in a target cell, the base station sends a second setup command to the UE by using the SRB, where the second setup command includes a configuration parameter of an SRB established between the UE and the target cell.

In this embodiment, because the transmission channel and the physical channel occupied by the SRB of the UE are different from the transmission channel and the physical channel occupied by the at least one of the N DRBs, the base station may independently re-establish the SRB of the UE in the target cell. The target cell is a cell to which the SRB is to be handed over. A specific process is as follows:

When the UE needs to transmit the control data in the target cell, that is, the UE needs to establish the SRB with the target cell, the base station obtains the configuration parameter of the SRB established between the UE and the target cell. The configuration parameter of the SRB established between the UE and the target cell is used to indicate a transmission channel and a physical channel occupied by the SRB established between the UE and the target cell, and further indicate a logical channel occupied by the SRB established between the UE and the target cell. In addition, the transmission channel occupied by the SRB established between the UE and the target cell is different from the transmission channel occupied by the DRB, and the physical channel occupied by the SRB established between the UE and the target cell is different from the physical channel occupied by the at least one of the N DRBs. If the target cell is a cell controlled by the base station, the base station may determine the configuration parameter of the SRB established between the UE and the target cell. If the target cell is a cell controlled by another base station, the base station requests the base station that controls the target cell, to obtain the configuration parameter of the SRB established between the UE and the target cell. Then, the base station adds the configuration parameter of the SRB established between the UE and the target cell to the first setup command, and sends the first setup command to the UE by using the SRB established by the UE.

S602. The UE receives, by using the SRB, the second setup command sent by the base station, where the second setup command includes the configuration parameter of the SRB established between the UE and the target cell.

S603. The UE establishes the SRB with the target cell according to the second setup command.

In this embodiment, the UE receives, by using the SRB established with the base station, the second setup command sent by the base station. The UE obtains the configuration parameter of the SRB established between the UE and the target cell from the second setup command. Then, the UE establishes the SRB with the target cell according to the configuration parameter of the SRB established between the UE and the target cell. If the target cell is a cell controlled by the base station, the UE and the base station establish a new SRB according to the configuration parameter of the SRB established between the UE and the target cell. If the target cell is a cell controlled by another base station, the UE and the another base station establish a new SRB according to the configuration parameter of the SRB established between the UE and the target cell.

After the base station determines that the UE establishes the SRB with the target cell, the base station may release a resource occupied by the SRB in a source cell. The source cell is a cell in which the SRB of the UE is located before the UE establishes the SRB with the target cell.

According to the radio bearer setup method provided in this embodiment of the present invention, when the base station determines that the UE needs to transmit control data in a target cell, the base station sends a second setup command to the UE by using the SRB. The second setup command includes a configuration parameter of an SRB established between the UE and the target cell. The UE establishes the SRB with the target cell according to the second setup command. Therefore, the SRB of the UE may be independently re-established.

Figure 11A:
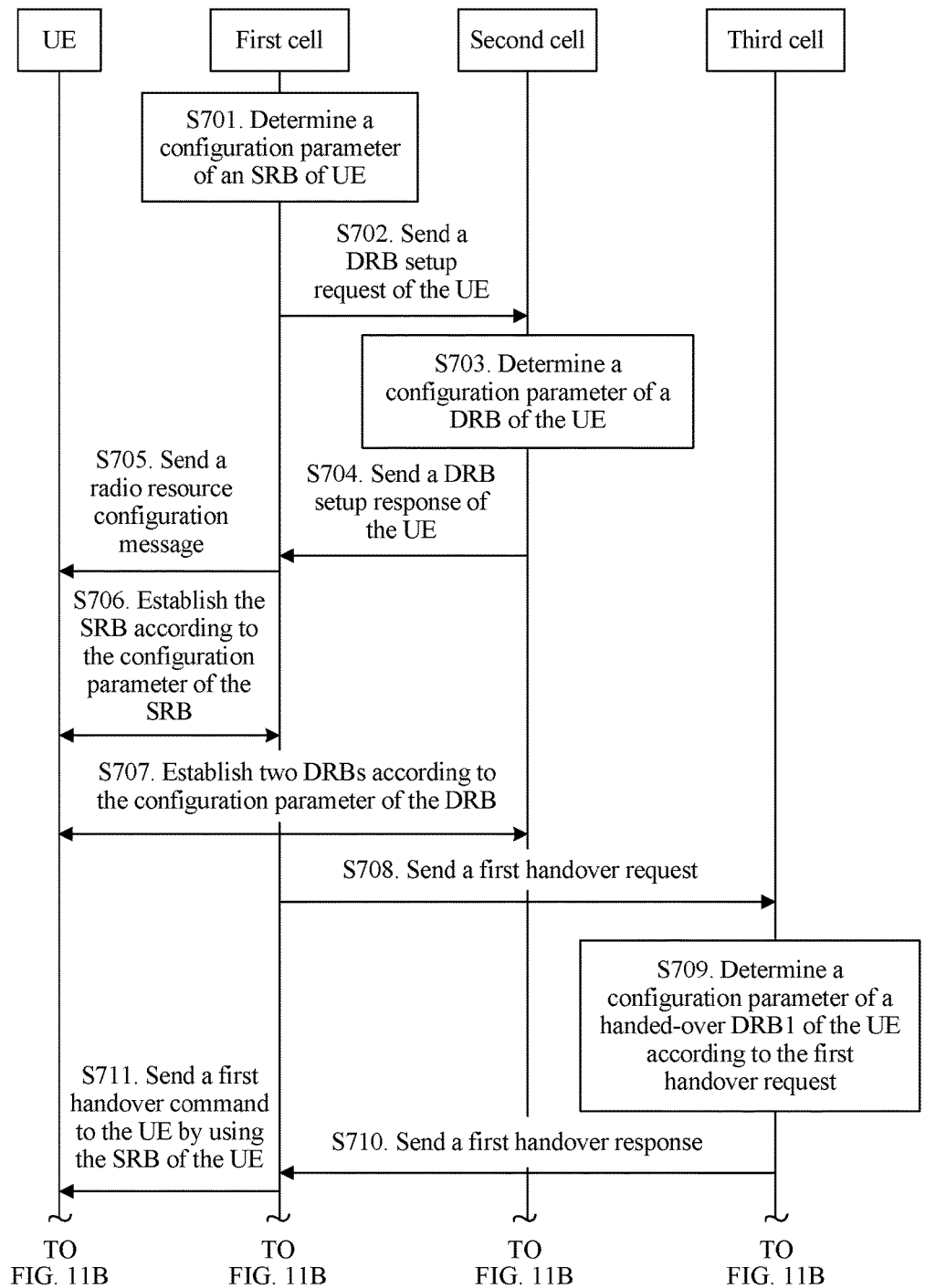
FIG. 11A and FIG. 11B are a flowchart of Embodiment 7 of a radio bearer setup method according to the present invention.
Figure 11B:
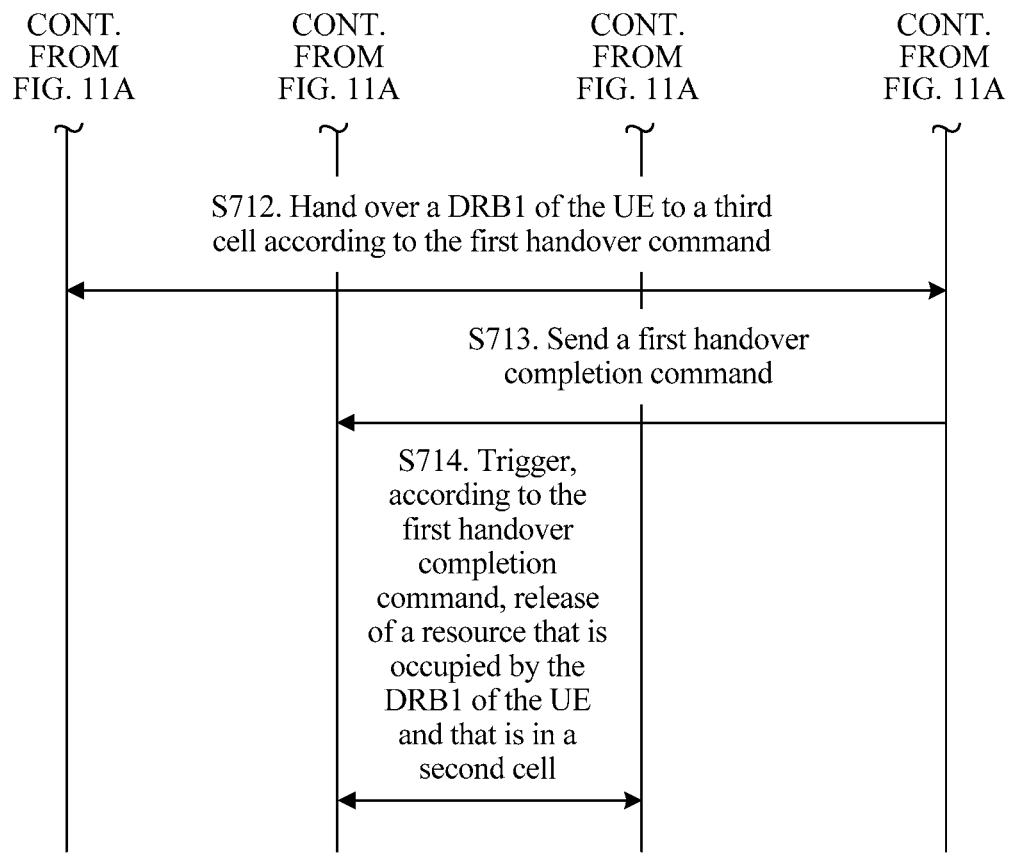

FIG. 11A and FIG. 11B are a flowchart of Embodiment 7 of a radio bearer setup method according to the present invention. As shown in FIG. 11A and FIG. 11B, the method in this embodiment is described by using an example in which an SRB and a DRB of UE are established in different cells. For example, the UE establishes two DRBs herein. A first cell means that an execution body is a base station that controls the first cell, a second cell means that an execution body is a base station that controls the second cell, and a third cell means that an execution body is a base station that controls the third cell. The method in this embodiment may include the following steps.

S701. Determine a configuration parameter of an SRB of the UE.

S702. Send an SRB setup request of the UE.

S703. Determine a configuration parameter of a DRB of the UE.

S704. Send a DRB setup response of the UE.

In this embodiment, the first cell determines the configuration parameter of the SRB of the UE in a random access process of the UE. After the UE and a core network device complete a service negotiation process, if the first cell determines that two DRBs of the UE need to be established in the second cell, the first cell may send a DRB setup request of the UE to the second cell, to request the second cell to allocate a resource to the UE. After receiving the DRB setup request of the UE sent by the first cell, the second cell determines configuration parameters of the two DRBs of the UE, and then generates the DRB setup response of the UE according to the configuration parameter of the DRB of the UE. The DRB setup response of the UE includes the configuration parameters of the two DRBs of the UE. A base station that serves the first cell is the same as a base station that serves the second cell, or a base station that serves the first cell is different from a base station that serves the second cell.

S705. Send a radio resource configuration message.

In this embodiment, the first cell receives the DRB setup response of the UE sent by the second cell, obtains the configuration parameters of the two DRBs of the UE from the DRB setup response of the UE, adds the configuration parameter of the SRB and the configuration parameters of the two DRBs to the radio resource configuration message, and sends the radio resource configuration message to the UE. The configuration parameter of the SRB is used to indicate a transmission channel and a physical channel occupied by the SRB. The configuration parameters of the two DRBs are used to indicate transmission channels and physical channels occupied by the two DRBs. The two DRBs occupy different transmission channels and different physical channels, and the transmission channel and the physical channel occupied by the SRB are different from the transmission channels and the physical channels occupied by the two DRBs.

S706. Establish the SRB according to the configuration parameter of the SRB.

S707. Establish two DRBs according to the configuration parameter of the DRB.

In this embodiment, the UE may establish the SRB with the first cell according to the configuration parameter of the SRB in the radio resource configuration message. The UE may further establish the two DRBs according to the configuration parameters, in the radio resource configuration message, of the two DRBs that carry two services. The two established DRBs occupy different transmission channels and different physical channels, and the transmission channel and the physical channel occupied by the SRB are different from the transmission channels and the physical channels occupied by the two DRBs. Therefore, all DRBs of the UE are separated, and an SRB and a DRB are separated.

In this embodiment, the following description may be further included after all radio bearers of the UE are separated. The two DRBs of the UE are respectively a DRB1 and a DRB2. The DRB1 is used to carry data of a first service, and the DRB2 is used to carry data of a second service.

The first cell may receive measurement reports of the first cell and a neighboring cell and measurement reports of the second cell and a neighboring cell that are reported by the UE by using the SRB of the UE. If the first cell learns, according to the foregoing measurement reports, that quality of the second cell cannot ensure a QoS requirement of the DRB1 of the UE, but the third cell can ensure the QoS requirement of the DRB1 of the UE, the first cell may hand over, to the third cell, the DRB1 that is of the UE and that is used to carry the data of the first service. The first cell may obtain a configuration parameter of the handed-over DRB1 of the UE. Specifically, the first cell may obtain the configuration parameter of the handed-over DRB1 of the UE by using S708 to S710. A base station that serves the third cell is the same as the base station that serves the first cell, or a base station that serves the third cell is different from the base station that serves the first cell.

S708. Send a first handover request.

In this embodiment, the first cell sends the first handover request to a target handover cell of the DRB1 of the UE, that is, the third cell in this embodiment. The first handover request is used to request to hand over the DRB1 of the UE to the third cell.

S709. Determine a configuration parameter of a handed-over DRB1 of the UE according to the first handover request.

In this embodiment, the third cell receives the first handover request sent by the first cell. The first handover request is used to request to hand over the DRB1 of the UE to the third cell. The third cell may configure a resource for the DRB1 of the UE according to the first handover request, that is, the third cell determines, according to the first handover request, the configuration parameter of the DRB1 that is of the UE and that is handed over to the third cell, that is, the configuration parameter of the handed-over DRB1 of the UE. The configuration parameter of the handed-over DRB1 of the UE is used to indicate a transmission channel and a physical channel occupied by the handed-over DRB1 of the UE. The transmission channel and the physical channel occupied by the handed-over DRB1 of the UE are different from a transmission channel and a physical channel occupied by the DRB2 of the UE, and are different from the transmission channel and the physical channel occupied by the SRB of the UE.

S710. Send a first handover response.

In this embodiment, after determining the configuration parameter of the handed-over DRB1 of the UE, the third cell may generate the first handover response according to the configuration parameter of the handed-over DRB1. The first handover response includes the configuration parameter of the handed-over DRB1 of the UE. Correspondingly, the first cell may receive the first handover response sent by the third cell.

S711. Send a first handover command to the UE by using the SRB of the UE.

In this embodiment, after the first cell receives the first handover response sent by the third cell, the first cell may determine that the third cell allows the UE to hand over the DRB1 to the third cell. The first cell may generate the first handover command according to an identifier of the third cell and the configuration parameter of the handed-over DRB1 of the UE in the first handover response. The first handover command includes the identifier of the third cell and the configuration parameter of the handed-over DRB1 of the UE. Then, the first cell sends the first handover command to the UE by using the SRB of the UE. Correspondingly, the UE may receive, by using the SRB of the UE, the first handover command sent by the first cell.

S712. Hand over a DRB1 of the UE to the third cell according to the first handover command.

In this embodiment, the UE and the third cell may hand over the DRB1 of the UE from a source cell of the DRB1 of the UE to the target handover cell of the DRB1 of the UE according to the first handover command. In this embodiment, the source cell of the DRB1 of the UE is the second cell, that is, the UE hands over the DRB1 of the UE from the second cell to the third cell. The UE may delete the DRB1 between the UE and the second cell, and establish a DRB1 between the UE and the third cell. A transmission channel occupied by the DRB1 established between the UE and the third cell is different from the transmission channel occupied by the DRB2 of the UE, and a physical channel occupied by the DRB1 established between the UE and the third cell is different from the physical channel occupied by the DRB2 of the UE.

The SRB may be carried in a system that has large coverage and high reliability and has no frequent handover, and the DRB may be carried in relatively close transmit and receive points of a high rate and a small time delay. In this embodiment of the present invention, because a DRB and an SRB of the UE are separated, and all DRBs of the UE are separated, when the UE hands over the DRB of the UE, the UE does not need to hand over the SRB of the UE, and does not need to hand over other DRBs of the UE either, thereby implementing separate handovers of the DRB and the SRB of the UE and separate handovers of all the DRBs. The SRB is carried in a cell of a low frequency and large coverage, to reduce a handover quantity of the SRB, thereby avoiding a call drop. The DRB is carried in a cell of a low frequency and small coverage, to improve a network throughput.

Further, the method in this embodiment may further include the following description.

S713. Send a first handover completion command.

In this embodiment, if the UE and the third cell complete a handover process of the DRB1 of the UE, the third cell sends the first handover completion command to the first cell. The first handover completion command is used to indicate that the UE successfully hands over the DRB1 of the UE to the third cell.

Correspondingly, the first cell receives the first handover completion command sent by the third cell.

S714. Trigger, according to the first handover completion command, release of a resource that is occupied by the DRB1 of the UE and that is in the second cell.

In this embodiment, when receiving the first handover completion command sent by the third cell, the first cell may learn that the DRB1 of the UE is successfully handed over to the third cell. In this case, the first cell may trigger, according to the first handover completion command, a release of a resource that is occupied by the DRB1 of the UE and that is in the source cell of the DRB1 of the UE. In this embodiment, the source cell of the DRB1 of the UE is the second cell. Therefore, the first cell triggers the release of the resource that is occupied by the DRB1 of the UE and that is in the second cell. For example, the first cell sends a resource release command to the second cell. The resource release command is used to instruct the second cell to release the resource that is occupied by the DRB1 of the UE and that is in the second cell. The second cell may release, according to the resource release command sent by the first cell, the resource that is occupied by the DRB1 of the UE and that is in the second cell.

According to the radio bearer setup method provided in this embodiment of the present invention, after two DRBs established by UE are separated, a first cell may send a first handover request to a third cell. The third cell sends a first handover response to the first cell after configuring a resource. The first cell sends a first handover command to the UE by using an SRB of the UE. Then, the UE hands over a DRB1 of the UE to the third cell according to the first handover command. Therefore, DRBs of the UE may be separately handed over.

Figure 12A:
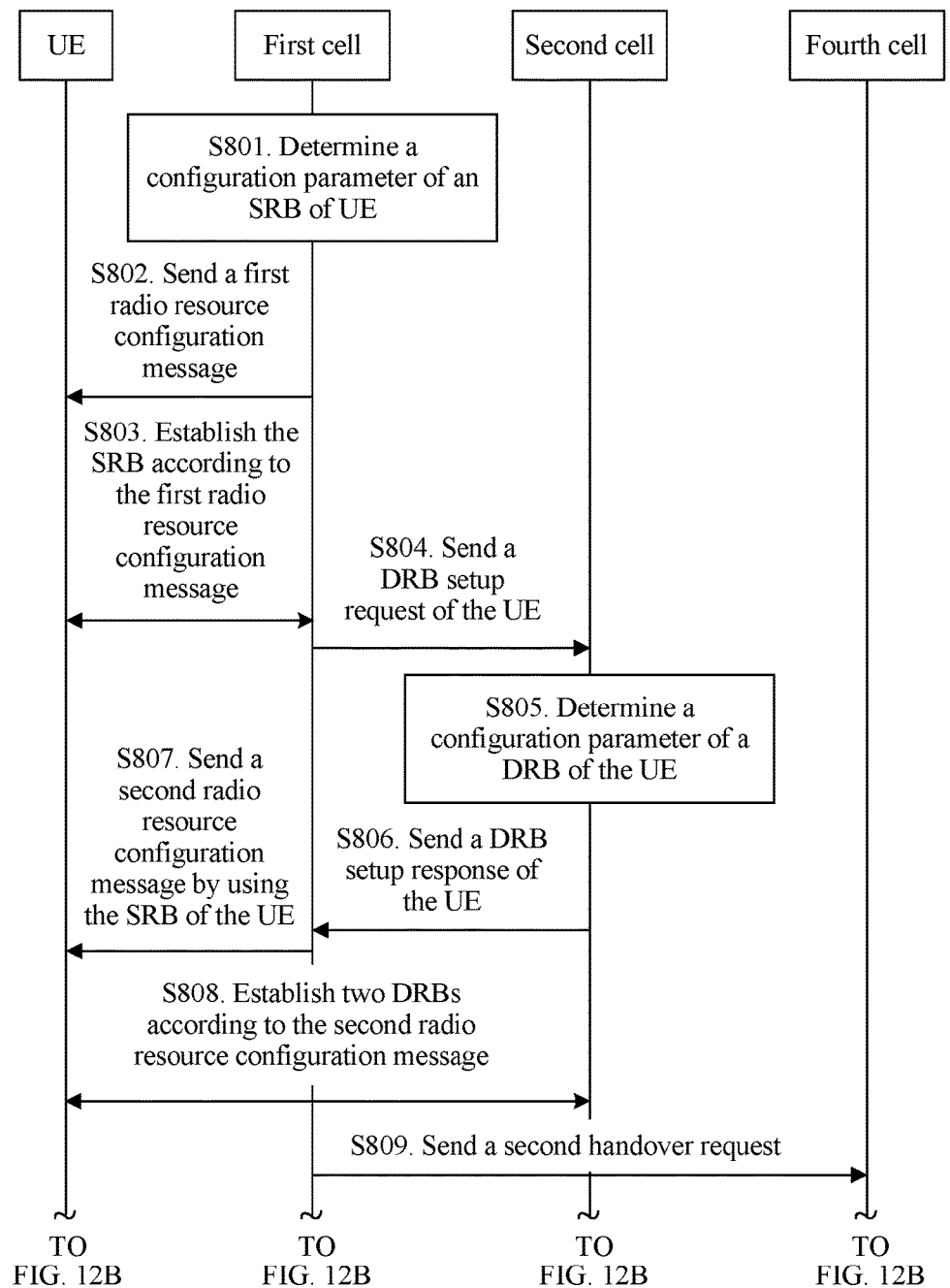
FIG. 12 is a flowchart of Embodiment 8 of a radio bearer setup method according to the present invention.
Figure 12B:
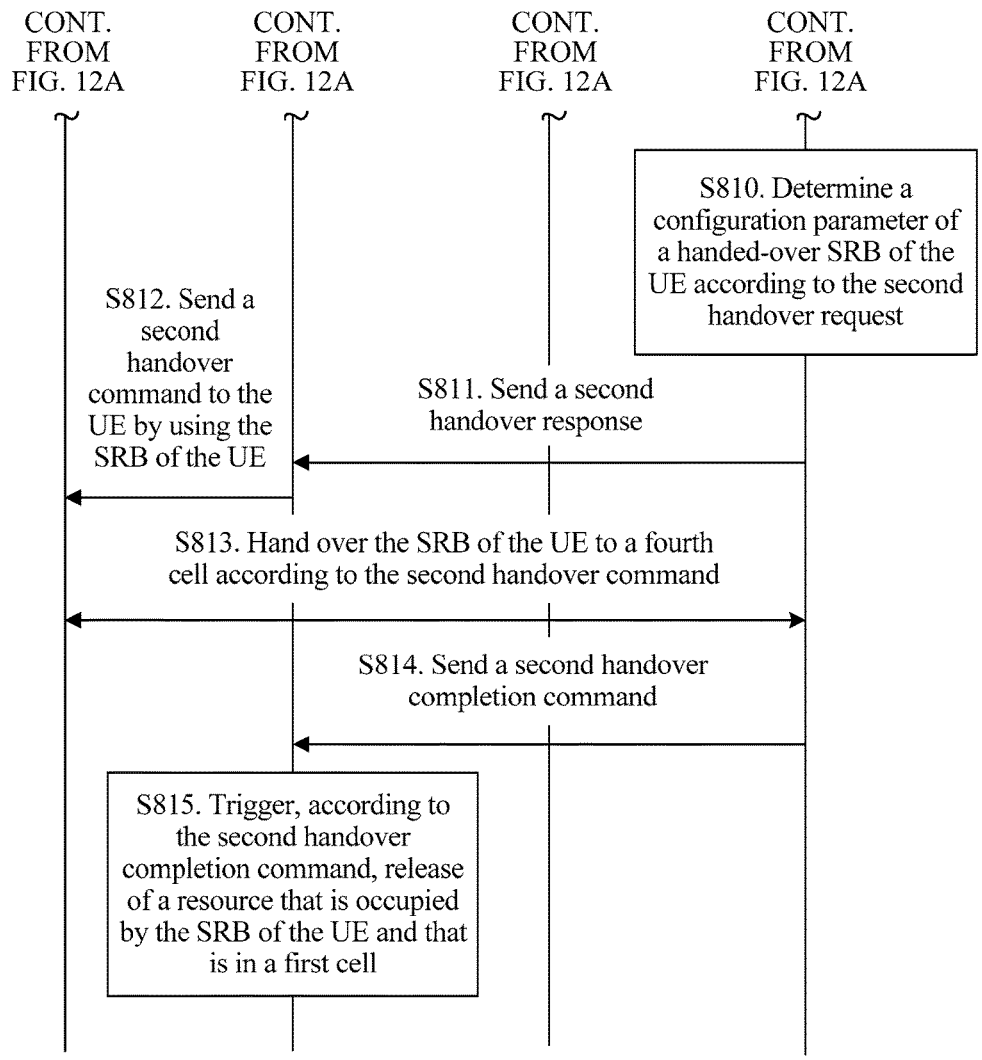

FIG. 12 is a flowchart of Embodiment 8 of a radio bearer setup method according to the present invention. As shown in FIG. 12, the method in this embodiment is described by using an example in which an SRB and a DRB of UE are established in different cells. For example, the UE establishes two DRBs herein. A first cell means that an execution body is a base station that controls the first cell, a second cell means that an execution body is a base station that controls the second cell, and a fourth cell means that an execution body is a base station that controls the fourth cell. The method in this embodiment may include the following steps.

S801. Determine a configuration parameter of an SRB of the UE.

S802. Send a first radio resource configuration message.

S803. Establish the SRB according to the first radio resource configuration message.

In this embodiment, the first cell determines the configuration parameter of the SRB of the UE in a random access process of the UE, where the configuration parameter of the SRB is used to indicate a transmission channel and a physical channel occupied by the SRB; and then adds the configuration parameter of the SRB to the first radio resource configuration message, and sends the first radio resource configuration message to the UE. Then, the first cell and the UE establish the SRB according to the configuration parameter of the SRB in the first radio resource configuration message.

S804. Send a DRB setup request of the UE.

S805. Determine a configuration parameter of a DRB of the UE.

S806. Send a DRB setup response of the UE.

In this embodiment, after the UE and a core network device complete a service negotiation process, if the first cell determines that the DRB needs to be established in the second cell, the first cell may send the DRB setup request of the UE to the second cell, to request the second cell to allocate a resource to the UE. After receiving the DRB setup request of the UE sent by the first cell, the second cell determines the configuration parameter of the DRB of the UE, and then generates the DRB setup response of the UE according to the configuration parameter of the DRB of the UE. The DRB setup response of the UE includes the configuration parameter of the DRB of the UE. A base station that serves the first cell is the same as a base station that serves the second cell, or a base station that serves the first cell is different from a base station that serves the second cell.

S807. Send a second radio resource configuration message by using the SRB of the UE.

In this embodiment, the first cell receives the DRB setup response of the UE sent by the second cell, obtains configuration parameters of two DRBs of the UE from the DRB setup response of the UE, adds the configuration parameters of the two DRBs to the second radio resource configuration message, and sends the second radio resource configuration message to the UE by using the SRB of the UE. The configuration parameters of the two DRBs are used to indicate transmission channels and physical channels occupied by the two DRBs. The two DRBs occupy different transmission channels and different physical channels, and the transmission channel and the physical channel occupied by the SRB are different from the transmission channels and the physical channels occupied by the two DRBs.

S808. Establish two DRBs according to the second radio resource configuration message.

In this embodiment, the second cell and the UE may establish the two DRBs of the UE according to the configuration parameters of the two DRBs in the second radio resource configuration message. The two established DRBs occupy different transmission channels and different physical channels, and the transmission channel and the physical channel occupied by the SRB are different from the transmission channels and the physical channels occupied by the two DRBs. Therefore, all DRBs of the UE are separated, and an SRB and a DRB are separated.

In this embodiment, the following description may be further included after all radio bearers of the UE are separated.

The first cell may receive measurement reports of the first cell and a neighboring cell and measurement reports of the second cell and a neighboring cell that are reported by the UE by using the SRB of the UE. If the first cell learns, according to the foregoing measurement reports, that quality of the first cell cannot ensure a QoS requirement of the SRB of the UE, but the fourth cell can ensure the QoS requirement of the SRB of the UE, the first cell may hand over the SRB of the UE to the fourth cell. The first cell may obtain a configuration parameter of a handed-over SRB of the UE. Specifically, the first cell may obtain the configuration parameter of the handed-over SRB of the UE by using S809 to S811. A base station that serves the fourth cell is the same as the base station that serves the first cell, or a base station that serves the fourth cell is different from the base station that serves the first cell.

S809. Send a second handover request.

In this embodiment, the first cell sends the second handover request to a target handover cell of the SRB of the UE, that is, the fourth cell in this embodiment. The second handover request is used to request to hand over the SRB of the UE to the fourth cell.

S810. Determine a configuration parameter of a handed-over SRB of the UE according to the second handover request.

In this embodiment, the fourth cell receives the second handover request sent by the first cell. The second handover request is used to request to hand over the SRB of the UE to the fourth cell. The fourth cell may configure a resource for the SRB of the UE according to the second handover request, that is, the fourth cell determines, according to the second handover request, the configuration parameter of the SRB that is of the UE and that is handed over to the fourth cell, that is, the configuration parameter of the handed-over SRB of the UE. The configuration parameter of the handed-over SRB of the UE is used to indicate a transmission channel and a physical channel occupied by the handed-over SRB of the UE. The transmission channel occupied by the handed-over SRB of the UE is different from the transmission channels occupied by the two DRBs of the UE, and the physical channel occupied by the handed-over SRB of the UE is different from the physical channels occupied by the two DRBs of the UE.

S811. Send a second handover response.

In this embodiment, after determining the configuration parameter of the handed-over SRB of the UE, the fourth cell may generate the second handover response according to the configuration parameter of the handed-over SRB. The second handover response includes the configuration parameter of the handed-over SRB of the UE. Correspondingly, the first cell may receive the second handover response sent by the fourth cell.

S812. Send a second handover command to the UE by using the SRB of the UE.

In this embodiment, after the first cell receives the second handover response sent by the fourth cell, the first cell may determine that the fourth cell allows the UE to hand over the SRB to the fourth cell. The first cell may generate the second handover command according to an identifier of the fourth cell and the configuration parameter of the handed-over SRB of the UE in the second handover response. The second handover command includes the identifier of the fourth cell and the configuration parameter of the handed-over SRB of the UE. Then, the first cell sends the second handover command to the UE by using the SRB of the UE. Correspondingly, the UE may receive, by using the SRB of the UE, the second handover command sent by the first cell.

S813. Hand over the SRB of the UE to the fourth cell according to the second handover command.

In this embodiment, the UE and the fourth cell may hand over the SRB of the UE from a source cell of the SRB of the UE to the target handover cell of the SRB of the UE according to the second handover command. In this embodiment, the source cell of the SRB of the UE is the first cell, that is, the UE hands over the SRB of the UE from the first cell to the fourth cell. The UE may delete the SRB between the UE and the first cell, and establish an SRB between the UE and the fourth cell. A transmission channel and a physical channel occupied by the SRB established between the UE and the fourth cell are different from the transmission channels and the physical channels occupied by the two DRBs of the UE.

The SRB may be carried in a system that has large coverage and high reliability and has no frequent handover, and the DRB may be carried in relatively close transmit and receive points of a high rate and a small time delay. In this embodiment of the present invention, because an SRB and a DRB of the UE are separated, when the UE hands over the SRB of the UE, the UE does not need to hand over the DRB of the UE, thereby implementing separate handovers of the SRB and the DRB of the UE. The SRB is carried in a cell of a low frequency and large coverage, to reduce a handover quantity of the SRB, thereby avoiding a call drop. The DRB is carried in a cell of a low frequency and small coverage, to improve a network throughput.

Further, the method in this embodiment may further include the following description.

S814. Send a second handover completion command.

In this embodiment, if the UE and the fourth cell complete a handover process of the SRB of the UE, the fourth cell sends the second handover completion command to the first cell. The second handover completion command is used to indicate that the UE successfully hands over the SRB of the UE to the fourth cell. Correspondingly, the first cell receives the second handover completion command sent by the fourth cell.

S815. Trigger, according to the second handover completion command, release of a resource that is occupied by the SRB of the UE and that is in the first cell.

In this embodiment, when receiving the second handover completion command sent by the fourth cell, the first cell may learn that the SRB of the UE is successfully handed over to the fourth cell. In this case, the first cell may trigger, according to the second handover completion command, release of a resource that is occupied by the SRB of the UE and that is in the source cell of the SRB of the UE. In this embodiment, the source cell of the SRB of the UE is the first cell. Therefore, the first cell triggers the release of the resource that is occupied by the SRB of the UE and that is in the first cell.

According to the radio bearer setup method provided in this embodiment of the present invention, after an SRB and a DRB established by UE are separated, a first cell may send a second handover request to a fourth cell. The fourth cell sends a second handover response to the first cell after configuring a resource. The first cell sends a second handover command to the UE by using the SRB of the UE. Then, the UE hands over the SRB of the UE to the fourth cell according to the second handover command. Therefore, the SRB of the UE may be independently handed over.

Figure 13:
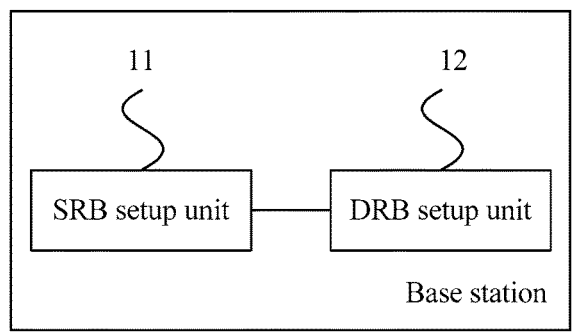
FIG. 13 is a schematic structural diagram of Embodiment 1 of a base station according to the present invention.

FIG. 13 is a schematic structural diagram of Embodiment 1 of a base station according to the present invention. As shown in FIG. 13, the base station in this embodiment may include an SRB setup unit 11 and a DRB setup unit 12. The SRB setup unit 11 is configured to establish an SRB with UE according to a configuration parameter of the SRB, where the configuration parameter of the SRB is used to indicate a transmission channel and a physical channel occupied by the SRB. The DRB setup unit 12 is configured to establish, according to configuration parameters of N DRBs that carry N services, the N DRBs with the UE, where N is an integer greater than or equal to 2, and the configuration parameters of the N DRBs are used to indicate transmission channels and physical channels occupied by the N DRBs.

M of the N DRBs occupy different transmission channels and different physical channels, M is an integer greater than or equal to 2 and less than or equal to N, and the transmission channel and the physical channel occupied by the SRB are different from a transmission channel and a physical channel occupied by at least one of the N DRBs.

The base station in this embodiment may be configured to execute the technical solution executed by the base station in the foregoing method embodiment of the present invention. An implementation principle and a technical effect of the base station in this embodiment are similar to those of the base station in the foregoing method embodiment. For details, refer to a related record in the foregoing method embodiment of the present invention. Details are not described herein again.

Figure 14:
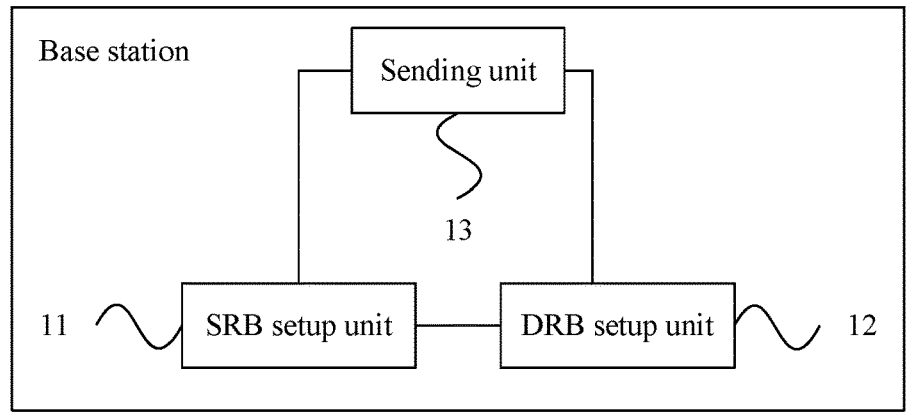
FIG. 14 is a schematic structural diagram of Embodiment 2 of a base station according to the present invention.

FIG. 14 is a schematic structural diagram of Embodiment 2 of a base station according to the present invention. As shown in FIG. 14, based on a structure shown in FIG. 13, the base station in this embodiment further includes a sending unit 13.

In a feasible implementation, the sending unit 13 is configured to: before the SRB setup unit 11 establishes the SRB with the UE according to the configuration parameter of the SRB, send the configuration parameter of the SRB and the configuration parameters of the N DRBs to the UE.

In another feasible implementation, the sending unit 13 is configured to: before the DRB setup unit 12 establishes the N DRBs with the UE according to the configuration parameters of the N DRBs, send the configuration parameters of the N DRBs to the UE by using the SRB.

Optionally, M cells that respectively establish the M DRBs with the UE are different.

Optionally, RATs of the M cells that respectively establish the M DRBs with the UE are different.

Optionally, the sending unit 13 is further configured to: after the DRB setup unit 12 establishes the N DRBs with the UE according to the configuration parameters of the N DRBs, when the UE needs to transmit service data in a target cell, send a first setup command to the UE by using the SRB, where the target cell is a cell to which K of the N DRBs are to be handed over.

$1 \leq K < N$, K is an integer, the first setup command includes a configuration parameter of a DRB established between the UE and the target cell, the configuration parameter of the DRB established between the UE and the target cell is used to indicate a transmission channel and a physical channel occupied by the DRB established between the UE and the target cell, and transmission channels and physical channels occupied by the K DRBs established between the UE and the target cell are different from a transmission channel and a physical channel occupied by at least one of the N DRBs except the K DRBs.

Optionally, the sending unit 13 is further configured to: after the SRB setup unit 11 establishes the SRB with the UE according to the configuration parameter of the SRB, when the UE needs to transmit control data in a target cell, send a second setup command to the UE by using the SRB, where the second setup command includes a configuration parameter of an SRB established between the UE and the target cell, and the target cell is a cell to which the SRB is to be handed over.

The configuration parameter of the SRB established between the UE and the target cell is used to indicate a transmission channel and a physical channel occupied by the SRB established between the UE and the target cell, and the transmission channel and the physical channel occupied by the SRB established between the UE and the target cell are different from the transmission channel and the physical channel occupied by the at least one of the N DRBs.

The base station in this embodiment may be configured to execute the technical solution executed by the base station in the foregoing method embodiment of the present invention. An implementation principle and a technical effect of the base station in this embodiment are similar to those of the base station in the foregoing method embodiment. For details, refer to a related record in the foregoing method embodiment of the present invention. Details are not described herein again.

Figure 15:
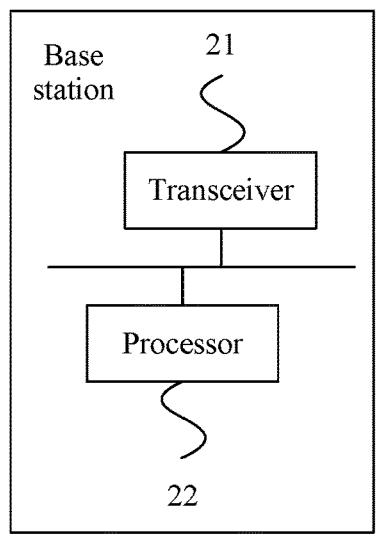
FIG. 15 is a schematic structural diagram of Embodiment 3 of a base station according to the present invention.

FIG. 15 is a schematic structural diagram of Embodiment 3 of a base station according to the present invention. As shown in FIG. 15, the base station in this embodiment may include a transceiver 21 and a processor 22. The transceiver 21 is configured to communicate with an external of the base station. The processor 22 is configured to: establish an SRB with UE according to a configuration parameter of the SRB, where the configuration parameter of the SRB is used to indicate a transmission channel and a physical channel occupied by the SRB; and establish, according to configuration parameters of N DRBs that carry N services, the N DRBs with the UE, where N is an integer greater than or equal to 2, and the configuration parameters of the N DRBs are used to indicate transmission channels and physical channels occupied by the N DRBs.

M of the N DRBs occupy different transmission channels and different physical channels, M is an integer greater than or equal to 2 and less than or equal to N, and the transmission channel and the physical channel occupied by the SRB are different from a transmission channel and a physical channel occupied by at least one of the N DRBs.

In a feasible implementation, the processor 22 is further configured to: before establishing the SRB with the UE according to the configuration parameter of the SRB, send the configuration parameter of the SRB and the configuration parameters of the N DRBs to the UE by using the transceiver 21.

In another feasible implementation, the processor 22 is further configured to: before establishing the N DRBs with the UE according to the configuration parameters of the N DRBs, send the configuration parameters of the N DRBs to the UE by using the transceiver 21 and by using the SRB.

Optionally, M cells that respectively establish the M DRBs with the UE are different.

Optionally, RATs of the M cells that respectively establish the M DRBs with the UE are different.

Optionally, the processor 22 is further configured to: after establishing the N DRBs with the UE according to the configuration parameters of the N DRBs, when the UE needs to transmit service data in a target cell, send a first setup command to the UE by using the transceiver 21 and by using the SRB, where the target cell is a cell to which K of the N DRBs are to be handed over.

$1 \leq K < N$, K is an integer, the first setup command includes a configuration parameter of a DRB established between the UE and the target cell, the configuration parameter of the DRB established between the UE and the target cell is used to indicate a transmission channel and a physical channel occupied by the DRB established between the UE and the target cell, and transmission channels and physical channels occupied by the K DRBs established between the UE and the target cell are different from a transmission channel and a physical channel occupied by at least one of the N DRBs except the K DRBs.

Optionally, the processor 22 is further configured to: after establishing the SRB with the UE according to the configuration parameter of the SRB, when the UE needs to transmit control data in a target cell, send a second setup command to the UE by using the transceiver 21 and by using the SRB, where the second setup command includes a configuration parameter of an SRB established between the UE and the target cell, and the target cell is a cell to which the SRB is to be handed over.

The configuration parameter of the SRB established between the UE and the target cell is used to indicate a transmission channel and a physical channel occupied by the SRB established between the UE and the target cell, and the transmission channel and the physical channel occupied by the SRB established between the UE and the target cell are different from the transmission channel and the physical channel occupied by the at least one of the N DRBs.

Optionally, the transceiver 21 and the processor 22 in this embodiment may be connected by using a bus or in another manner. If a bus is used for the connection, the base station in this embodiment further includes the bus.

Optionally, the base station in this embodiment may further include a memory (not shown in the figure). The memory is configured to store program code for executing a radio bearer setup method, and the processor 22 invokes the program code stored in the memory, to implement the foregoing solution.

It should be noted that, to implement the foregoing solution in this embodiment, a person skilled in the art may understand that the base station in this embodiment may further include an electronic circuit device and a bus (not shown in the figure) for connecting all components.

The base station in this embodiment may be configured to execute the technical solution executed by the base station in the foregoing method embodiment of the present invention. An implementation principle and a technical effect of the base station in this embodiment are similar to those of the base station in the foregoing method embodiment. For details, refer to a related record in the foregoing method embodiment of the present invention. Details are not described herein again.

Figure 16:
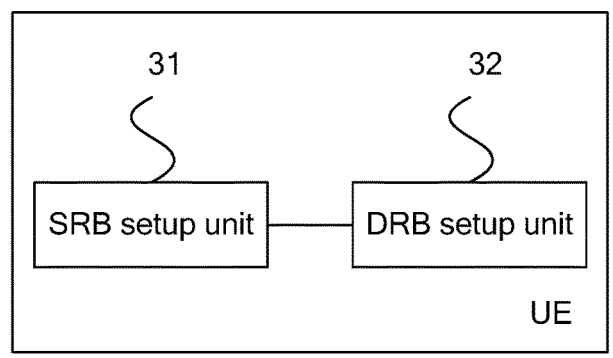
FIG. 16 is a schematic structural diagram of Embodiment 1 of UE according to the present invention.

FIG. 16 is a schematic structural diagram of Embodiment 1 of UE according to the present invention. As shown in FIG. 16, the UE in this embodiment may include an SRB setup unit 31 and a DRB setup unit 32. The SRB setup unit 31 is configured to establish an SRB with a base station according to a configuration parameter of the SRB, where the configuration parameter of the SRB is used to indicate a transmission channel and a physical channel occupied by the SRB. The DRB setup unit 32 is configured to establish, according to configuration parameters of N DRBs that carry N services, the N DRBs with the base station, where N is an integer greater than or equal to 2, and the configuration parameters of the N DRBs are used to indicate transmission channels and physical channels occupied by the N DRBs.

M of the N DRBs occupy different transmission channels and different physical channels, M is an integer greater than or equal to 2 and less than or equal to N, and the transmission channel and the physical channel occupied by the SRB are different from a transmission channel and a physical channel occupied by at least one of the N DRBs.

The UE in this embodiment may be configured to execute the technical solution executed by the UE in the foregoing method embodiment of the present invention. An implementation principle and a technical effect of the UE in this embodiment are similar to those of the UE in the foregoing method embodiment. For details, refer to a related record in the foregoing method embodiment of the present invention. Details are not described herein again.

Figure 17:
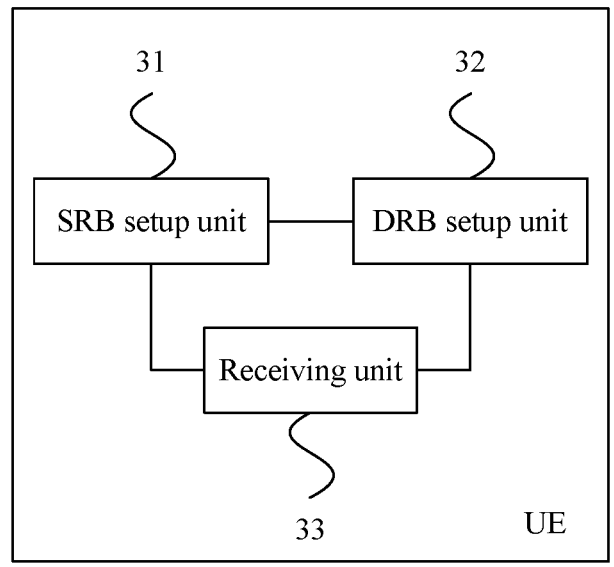
FIG. 17 is a schematic structural diagram of Embodiment 2 of UE according to the present invention.

FIG. 17 is a schematic structural diagram of Embodiment 2 of UE according to the present invention. As shown in FIG. 17, based on a structure shown in FIG. 16, the UE in this embodiment further includes a receiving unit 33.

In a feasible implementation, the receiving unit 33 is configured to: before the SRB setup unit 31 establishes the SRB with the base station according to the configuration parameter of the SRB, receive the configuration parameter of the SRB and the configuration parameters of the N DRBs that are sent by the base station.

In another feasible implementation, the receiving unit 33 is configured to: before the DRB setup unit 32 establishes the N DRBs with the base station according to the configuration parameters of the N DRBs, receive, by using the SRB, the configuration parameters that are of the N DRBs and that are sent by the base station.

Optionally, M cells that respectively establish the M DRBs with the UE are different.

Optionally, RATs of the M cells that respectively establish the M DRBs with the UE are different.

Optionally, the receiving unit 33 is further configured to: after the DRB setup unit 32 establishes the N DRBs with the base station according to the configuration parameters of the N DRBs, receive, by using the SRB, a first setup command sent by the base station, where the first setup command includes a configuration parameter of a DRB established between the UE and a target cell, the target cell is a cell to which K of the N DRBs are to be handed over, $1 \leq K < N$, K is an integer, and the configuration parameter of the DRB established between the UE and the target cell is used to indicate transmission channels and physical channels occupied by the K DRBs established between the UE and the target cell.

The DRB setup unit 32 is further configured to establish the K DRBs with the target cell according to the first setup command.

The transmission channels and the physical channels occupied by the K DRBs established between the UE and the target cell are different from a transmission channel and a physical channel occupied by at least one of the N DRBs except the K DRBs.

Optionally, the receiving unit 33 is further configured to: after the SRB setup unit 31 establishes the SRB with the base station according to the configuration parameter of the SRB, receive, by using the SRB, a second setup command sent by the base station, where the second setup command includes a configuration parameter of an SRB established between the UE and a target cell, the target cell is a cell to which the SRB is to be handed over, and the configuration parameter of the SRB established between the UE and the target cell is used to indicate a transmission channel and a physical channel occupied by the SRB established between the UE and the target cell.

The SRB setup unit 31 is further configured to establish the SRB with the target cell according to the second setup command.

The transmission channel and the physical channel occupied by the SRB established between the UE and the target cell are different from the transmission channel and the physical channel occupied by the at least one of the N DRBs.

The UE in this embodiment may be configured to execute the technical solution executed by the UE in the foregoing method embodiment of the present invention. An implementation principle and a technical effect of the UE in this embodiment are similar to those of the UE in the foregoing method embodiment. For details, refer to a related record in the foregoing method embodiment of the present invention. Details are not described herein again.

Figure 18:
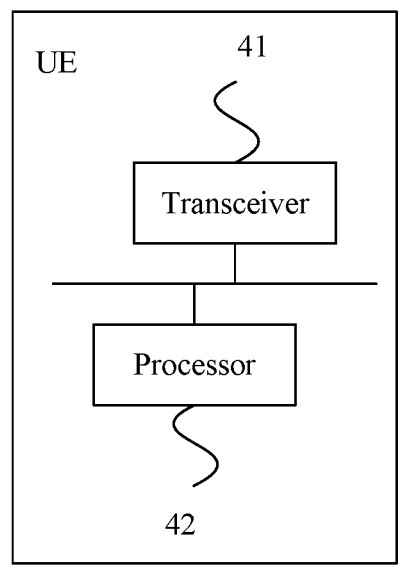
FIG. 18 is a schematic structural diagram of Embodiment 3 of UE according to the present invention.

FIG. 18 is a schematic structural diagram of Embodiment 3 of UE according to the present invention. As shown in FIG. 18, the UE in this embodiment may include a transceiver 41 and a processor 42. The transceiver 41 is configured to communicate with an external of the UE. The processor 42 is configured to: establish an SRB with a base station according to a configuration parameter of the SRB, where the configuration parameter of the SRB is used to indicate a transmission channel and a physical channel occupied by the SRB; and establish, according to configuration parameters of N DRBs that carry N services, the N DRBs with the base station, where N is an integer greater than or equal to 2, and the configuration parameters of the N DRBs are used to indicate transmission channels and physical channels occupied by the N DRBs.

M of the N DRBs occupy different transmission channels and different physical channels, M is an integer greater than or equal to 2 and less than or equal to N, and the transmission channel and the physical channel occupied by the SRB are different from a transmission channel and a physical channel occupied by at least one of the N DRBs.

In a feasible implementation, the processor 42 is further configured to: before establishing the SRB with the base station according to the configuration parameter of the SRB, receive, by using the transceiver 41, the configuration parameter of the SRB and the configuration parameters of the N DRBs that are sent by the base station.

In another feasible implementation, the processor 42 is further configured to: before establishing the N DRBs with the base station according to the configuration parameters of the N DRBs, receive, by using the transceiver 41 and by using the SRB, the configuration parameters that are of the N DRBs and that are sent by the base station.

Optionally, M cells that respectively establish the M DRBs with the UE are different.

Optionally, RATs of the M cells that respectively establish the M DRBs with the UE are different.

Optionally, the processor 42 is further configured to: after establishing the N DRBs with the base station according to the configuration parameters of the N DRBs, receive, by using the transceiver 41 and by using the SRB, a first setup command sent by the base station, where the first setup command includes a configuration parameter of a DRB established between the UE and a target cell, the target cell is a cell to which K of the N DRBs are to be handed over, $1 \leq K < N$, K is an integer, and the configuration parameter of the DRB established between the UE and the target cell is used to indicate transmission channels and physical channels occupied by the K DRBs established between the UE and the target cell; and establish the K DRBs with the target cell according to the first setup command.

The transmission channels and the physical channels occupied by the K DRBs established between the UE and the target cell are different from a transmission channel and a physical channel occupied by at least one of the N DRBs except the K DRBs.

Optionally, the processor 42 is further configured to: after establishing the SRB with the base station according to the configuration parameter of the SRB, receive, by using the transceiver 41 and by using the SRB, a second setup command sent by the base station, where the second setup command includes a configuration parameter of an SRB established between the UE and a target cell, the target cell is a cell to which the SRB is to be handed over, and the configuration parameter of the SRB established between the UE and the target cell is used to indicate a transmission channel and a physical channel occupied by the SRB established between the UE and the target cell; and establish the SRB with the target cell according to the second setup command.

The transmission channel and the physical channel occupied by the SRB established between the UE and the target cell are different from the transmission channel and the physical channel occupied by the at least one of the N DRBs.

Optionally, the transceiver 41 and the processor 42 in this embodiment may be connected by using a bus or in another manner. If a bus is used for the connection, the UE in this embodiment further includes the bus.

Optionally, the UE in this embodiment may further include a memory (not shown in the figure). The memory is configured to store program code for executing a radio bearer setup method, and the processor 42 invokes the program code stored in the memory, to implement the foregoing solution.

It should be noted that, to implement the foregoing solution in this embodiment, a person skilled in the art may understand that the UE in this embodiment may further include an electronic circuit device and a bus (not shown in the figure) for connecting all components.

The UE in this embodiment may be configured to execute the technical solution executed by the UE in the foregoing method embodiment of the present invention. An implementation principle and a technical effect of the UE in this embodiment are similar to those of the UE in the foregoing method embodiment. For details, refer to a related record in the foregoing method embodiment of the present invention. Details are not described herein again.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An apparatus, comprising:
   a non-transitory memory storage comprising instructions; and
   one or more hardware processors in communication with the memory storage, wherein the one or more hardware processors execute the instructions to:
   establish a Signaling Radio Bearer (SRB) with user equipment (UE) according to a configuration parameter of the SRB, wherein the configuration parameter of the SRB indicates a transmission channel and a physical channel occupied by the SRB;
   establish, according to configuration parameters of N Data Radio Bearers (DRBs) that carry N services, the N DRBs with the UE, wherein N is an integer greater than or equal to 2, and the configuration parameters of the N DRBs indicate transmission channels and physical channels occupied by the N DRBs; and
   wherein M of the N DRBs occupy different transmission channels and different physical channels, M is an integer greater than or equal to 2 and less than or equal to N, and the transmission channel and the physical channel occupied by the SRB are different from a transmission channel and a physical channel occupied by at least one of the N DRBs.

2. The apparatus according to claim 1, further comprising:
   a transmitter coupled with the one or more hardware processors, wherein the transmitter is configured to:
   before establishing the SRB with the UE according to the configuration parameter of the SRB, send the configuration parameter of the SRB and the configuration parameters of the N DRBs to the UE; and
   before establishing the N DRBs with the UE according to the configuration parameters of the N DRBs, send the configuration parameters of the N DRBs to the UE by using the SRB.

3. The apparatus according to claim 2,
   wherein M cells that respectively establish the M DRBs with the UE are different; and
   wherein radio access technologies (RATs) of the M cells that respectively establish the M DRBs with the UE are different.

4. The apparatus according to claim 1, further comprising: a transmitter coupled with the one or more hardware processors, wherein the transmitter is configured to:

after establishing the N DRBs with the UE according to the configuration parameters of the N DRBs, send a first setup command to the UE by using the SRB, wherein the first setup command sets up a target cell for the UE to transmit service data, and the target cell is a cell to which K of the N DRBs are to be handed over; and wherein $1 \leq K < N$, K is an integer, the first setup command comprises a configuration parameter of a DRB established between the UE and the target cell, the configuration parameter of the DRB established between the UE and the target cell indicates a transmission channel and a physical channel occupied by the DRB established between the UE and the target cell, and transmission channels and physical channels occupied by the K DRBs established between the UE and the target cell are different from a transmission channel and a physical channel occupied by at least one of the N DRBs that does not belong to the K DRBs.

5. The apparatus according to claim 1, further comprising: a transmitter coupled with the one or more hardware processors, wherein the transmitter is configured to:

after establishing the SRB with the UE according to the configuration parameter of the SRB, sending a second setup command to the UE by using the SRB, wherein the second setup command sets up a target cell for the UE to transmit control data and the second setup command comprises a configuration parameter of an SRB established between the UE and the target cell, and the target cell is a cell to which the SRB is to be handed over; and wherein the configuration parameter of the SRB established between the UE and the target cell indicates a transmission channel and a physical channel occupied by the SRB established between the UE and the target cell, and the transmission channel and the physical channel occupied by the SRB established between the UE and the target cell are different from the transmission channel and the physical channel occupied by the at least one of the N DRBs.

6. An apparatus, comprising:

a non-transitory memory storage comprising instructions; and one or more hardware processors in communication with the memory storage, wherein the one or more hardware processors execute the instructions to:

establish a Signaling Radio Bearer (SRB) with a network side device according to a configuration parameter of the SRB, wherein the configuration parameter of the SRB indicates a transmission channel and a physical channel occupied by the SRB;

establish, according to configuration parameters of N Data Radio Bearers (DRBs) that carry N services, the N DRBs with the network side device, wherein N is an integer greater than or equal to 2, and the configuration parameters of the N DRBs indicate transmission channels and physical channels occupied by the N DRBs; and wherein M of the N DRBs occupy different transmission channels and different physical channels, M is an integer greater than or equal to 2 and less than or equal to N, and the transmission channel and the physical channel occupied by the SRB are different from a transmission channel and a physical channel occupied by at least one of the N DRBs.

7. The apparatus according to claim 6, further comprising: a receiver coupled with the one or more hardware processors, wherein the receiver is configured to:

before establishing the SRB with the network side device according to the configuration parameter of the SRB, receive the configuration parameter of the SRB and the configuration parameters of the N DRBs that are sent by the network side device; and before establishing the N DRBs with the network side device according to the configuration parameters of the N DRBs, receive, by using the SRB, the configuration parameters of the N DRBs sent by the network side device.

8. The apparatus according to claim 6, wherein M cells that respectively establish the M DRBs are different; and wherein radio access technologies (RATs) of the M cells that respectively establish the M DRBs are different.

9. The apparatus according to claim 6, further comprising: a receiver coupled with the one or more hardware processors, wherein the receiver is configured to:

after establishing the N DRBs with the network side device according to the configuration parameters of the N DRBs, receive, by using the SRB, a first setup command sent by the network side device, wherein the first setup command comprises a configuration parameter of a DRB established between the UE and a target cell, the target cell is a cell to which K of the N DRBs are to be handed over, $1 \leq K < N$, K is an integer, and the configuration parameter of the DRB established between the UE and the target cell indicates transmission channels and physical channels occupied by the K DRBs established between the UE and the target cell; and the one or more hardware processors are further configured to establish the K DRBs with the target cell according to the first setup command, wherein the transmission channels and the physical channels occupied by the K DRBs established between the UE and the target cell are different from a transmission channel and a physical channel occupied by at least one of the N DRBs that does not belong to the K DRBs.

10. The apparatus according to claim 6, further comprising: a receiver coupled with the one or more hardware processors, wherein the receiver is configured to:

after establishing the SRB with the network side device according to the configuration parameter of the SRB, receive, by using the SRB, a second setup command sent by the network side device, wherein the second setup command comprises a configuration parameter of an SRB established between the UE and a target cell, the target cell is a cell to which the SRB is to be handed over, and the configuration parameter of the SRB established between the UE and the target cell indicates a transmission channel and a physical channel occupied by the SRB established between the UE and the target cell; and the one or more hardware processors are further configured to: establish the SRB with the target cell according to the second setup command, wherein the transmission channel and the physical channel occupied by the SRB established between the UE and the target cell are different from the transmission channel and the physical channel occupied by the at least one of the N DRBs.

11. A radio bearer setup method at user equipment (UE), comprising:

establishing a signaling radio bearer (SRB) with a network side device according to a configuration parameter of the SRB, wherein the configuration parameter of the SRB indicates a transmission channel and a physical channel occupied by the SRB;

establishing according to configuration parameters of N data radio bearers, DRBs, that carry N services, the N DRBs with the network side device, wherein N is an integer greater than or equal to 2, and the configuration parameters of the N DRBs indicate transmission channels and physical channels occupied by the N DRBs; and wherein M of the N DRBs occupy different transmission channels and different physical channels, M is an integer greater than or equal to 2 and less than or equal to N, and the transmission channel and the physical channel occupied by the SRB are different from a transmission channel and a physical channel occupied by at least one of the N DRBs.

12. The method according to claim 11, further comprising:

before establishing the SRB with the network side device according to the configuration parameter of the SRB, receiving the configuration parameter of the SRB and the configuration parameters of the N DRBs; and before establishing the N DRBs with the network side device according to the configuration parameters of the N DRBs, receiving, by using the SRB, the configuration parameters of the N DRBs sent by the network side device.

13. The method according to claim 11, wherein M cells that respectively establish the M DRBs with the UE are different; and wherein radio access technologies (RATs) of the M cells that respectively establish the M DRBs with the UE are different.

14. The method according to claim 11, further comprising:

after establishing the N DRBs with the network side device according to the configuration parameters of the N DRBs, receiving, by using the SRB, a first setup command sent by the network side device, wherein the first setup command comprises a configuration parameter of a DRB established between the UE and a target cell, the target cell is a cell to which K of the N DRBs are to be handed over, 1≤K<N, K is an integer, and the configuration parameter of the DRB established between the UE and the target cell indicates transmission channels and physical channels occupied by the K DRBs established between the UE and the target cell; and establishing, the K DRBs with the target cell according to the first setup command, wherein the transmission channels and the physical channels occupied by the K DRBs established between the UE and the target cell are different from a transmission channel and a physical channel occupied by at least one of the N DRBs that does not belong to the K DRBs.

15. The method according to claim 11, further comprising:

after the UE establishes the SRB with the network side device according to the configuration parameter of the SRB, receiving, by using the SRB, a second setup command sent by the network side device, wherein the second setup command comprises a configuration parameter of an SRB established between the UE and a target cell, the target cell is a cell to which the SRB is to be handed over, and the configuration parameter of the SRB established between the UE and the target cell indicates a transmission channel and a physical channel occupied by the SRB established between the UE and the target cell; and establishing, the SRB with the target cell according to the second setup command, wherein the transmission channel and the physical channel occupied by the SRB established between the UE and the target cell are different from the transmission channel and the physical channel occupied by the at least one of the N DRBs.

* * * * *